US012693495B2

(12) United States Patent
Chang et al.

(10) Patent No.: US 12,693,495 B2
(45) Date of Patent: Jul. 28, 2026

(54) IMAGING LENS

(71) Applicant: Rays Optics Inc., Hsinchu County (TW)

(72) Inventors: Ching-Sheng Chang, Hsinchu County (TW); Chien-Hsiung Tseng, Hsinchu County (TW)

(73) Assignee: YOUNG OPTICS INC., Hsinchu City (TW)

( * ) Notice: Subject to any disclaimer, the term of this patent is extended or adjusted under 35 U.S.C. 154(b) by 340 days.

(21) Appl. No.: 18/349,600

(22) Filed: Jul. 10, 2023

(65) Prior Publication Data

US 2024/0019670 A1     Jan. 18, 2024

(30) Foreign Application Priority Data

Jul. 13, 2022     (TW) .................................. 111126247

(51) Int. Cl.
| | |
|---|---|
| *G02B 9/12* | (2006.01) |
| *G02B 9/34* | (2006.01) |
| *G02B 9/60* | (2006.01) |
| *G02B 13/00* | (2006.01) |
| *G02B 13/14* | (2006.01) |

(52) U.S. Cl.
CPC ................. *G02B 9/12* (2013.01); *G02B 9/34* (2013.01); *G02B 9/60* (2013.01); *G02B 13/0035* (2013.01); *G02B 13/004* (2013.01); *G02B 13/0045* (2013.01); *G02B 13/008* (2013.01); *G02B 13/146* (2013.01)

(58) Field of Classification Search
CPC .... G02B 9/12; G02B 13/0035; G02B 13/008; G02B 13/146; G02B 17/0694; G02B 17/0896; G02B 27/1013; G02B 27/123; H04N 23/11
See application file for complete search history.

(56) References Cited

U.S. PATENT DOCUMENTS

| | | | | |
|---|---|---|---|---|
| 2011/0304764 A1* | 12/2011 | Shigemitsu | ........ | G02B 13/0035 348/E5.045 |
| 2012/0206639 A1* | 8/2012 | Matsui | ............... | G02B 13/0035 359/716 |
| 2014/0063623 A1* | 3/2014 | Ishizaka | ................... | G02B 3/04 359/716 |

(Continued)

FOREIGN PATENT DOCUMENTS

| | | |
|---|---|---|
| CN | 102236150 A | 11/2011 |
| CN | 109828346 A | 5/2019 |

(Continued)

*Primary Examiner* — Nicholas R. Pasko
(74) *Attorney, Agent, or Firm* — MUNCY, GEISSLER, OLDS & LOWE, P.C.

(57)     ABSTRACT

An imaging lens includes a first lens, a second lens and a third lens arranged in order from an object side to an image side. The imaging lens satisfies the conditions of 0.07 mm<dBFL<0.17 mm and 1<DL/LT<1.79, where dBFL denotes a distance between a focal plane formed by light with a wavelength of 587 nm and a focal plane formed by light with a wavelength of 940 nm on an optical axis of the imaging lens when a subject to be captured is at infinity, DL is a lens diameter of the third lens, LT is a distance measured on the optical axis of the imaging lens between an object-side surface of the first lens and an image-side surface of the third lens.

16 Claims, 18 Drawing Sheets

(56) References Cited

U.S. PATENT DOCUMENTS

| | | | | |
|---|---|---|---|---|
| 2016/0092731 A1* | 3/2016 | Dainty | .................. | G02B 5/208 |
| | | | | 348/78 |
| 2018/0031804 A1* | 2/2018 | Lee | .................... | G02B 13/0035 |
| 2018/0329179 A1* | 11/2018 | Chang | .................. | G02B 13/146 |
| 2018/0348488 A1* | 12/2018 | Nishida | .................. | G02B 13/18 |
| 2020/0166731 A1* | 5/2020 | Gong | ....................... | G02B 9/34 |
| 2020/0341240 A1* | 10/2020 | Chang | ................... | G02B 7/008 |

FOREIGN PATENT DOCUMENTS

| | | | | | |
|---|---|---|---|---|---|
| CN | 209044153 U | | 6/2019 | | |
| CN | 111061046 A | | 4/2020 | | |
| CN | 113156616 A | * | 7/2021 | ......... | G02B 13/0035 |
| TW | I620968 B | | 4/2018 | | |
| TW | I674434 B | | 10/2019 | | |

* cited by examiner

IMAGING LENS

BACKGROUND OF THE INVENTION a. Field of the Invention

The invention relates to an optical lens, and, more particularly, to an infrared imaging lens.

b. Description of the Related Art

Infrared imaging lenses are commonly used in surveillance cameras, in-vehicle cameras or action cameras. For example, an infrared imaging lens is often used as an image pickup lens for a driver monitoring systems (DMS). Because DMS imaging lenses require active light sources with higher intensity than ambient light but not to interfere with or harm human eyes when detecting driving behavior and facial information of drivers, it is suitable for DMS imaging lenses to use infrared light (outside the human visible spectrum) for imaging. Moreover, lenses commonly used in consumer electronics often cannot provide reliable performance and clear vision in extreme temperature environments. Therefore, it is desirable to provide an imaging lens design that has a small volume, low thermal drift, high resolution, low manufacturing costs and improved infrared imaging quality.

BRIEF SUMMARY OF THE INVENTION

According to one aspect of the present disclosure, an imaging lens includes a first lens, a second lens and a third lens arranged in order from an object side to an image side and an aperture stop disposed between the object side and the second lens. The second lens and the third lens are aspheric lenses. The imaging lens satisfies the conditions of 0.07 mm<dBFL<0.17 mm and 1<DL/LT<1.79, where dBFL denotes a distance between a focal plane formed by light with a wavelength of 587 nm and a focal plane formed by light with a wavelength of 940 nm on an optical axis of the imaging lens when a subject to be captured is at infinity, DL is a lens diameter of the third lens, LT is a distance measured on the optical axis of the imaging lens between an object-side surface of the first lens and an image-side surface of the third lens.

According to another aspect of the present disclosure, an imaging lens includes a first lens with a refractive power closest to a magnified side of the imaging lens, a second lens with a refractive power, a third lens with a refractive power closest to a minified side of the imaging lens, and an aperture stop disposed between the magnified side and the second lens. The imaging lens includes at least two aspheric lenses and satisfies the conditions of 0.07 mm<dBFL<0.17 mm and 0.48<D1/DL<0.77, where dBFL denotes a distance between a focal plane formed by light with a wavelength of 587 nm and a focal plane formed by light with a wavelength of 940 nm on an optical axis of the imaging lens when a subject to be captured is at infinity, D1 is a lens diameter of the first lens, and DL is a lens diameter of the third lens.

In accordance with the above aspects, an infrared imaging lens with at least one of the advantages of lightweight, low manufacturing costs, low thermal drift, wide working temperature ranges, and high-resolution image quality can be provided.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. Further, "First," "Second," etc., as used herein, are used as labels for nouns that they precede, and do not imply any type of ordering (e.g., spatial, temporal, logical, etc.).

The term "lens" refers to an element made from a partially or entirely light-transmissive material with optical power. The material commonly includes plastic or glass.

In an imaging system, a magnified side (object side) may refer to one side of an optical path of an imaging lens comparatively near a subject to be picked-up, and a minified side (image side) may refer to other side of the optical path comparatively near a photosensor.

A certain region of an object side surface (or an image side surface) of a lens may be convex or concave. Herein, a convex or concave region is more outwardly convex or inwardly concave in the direction of an optical axis as compared with other neighboring regions of the object/image side surface.

Figure 1:
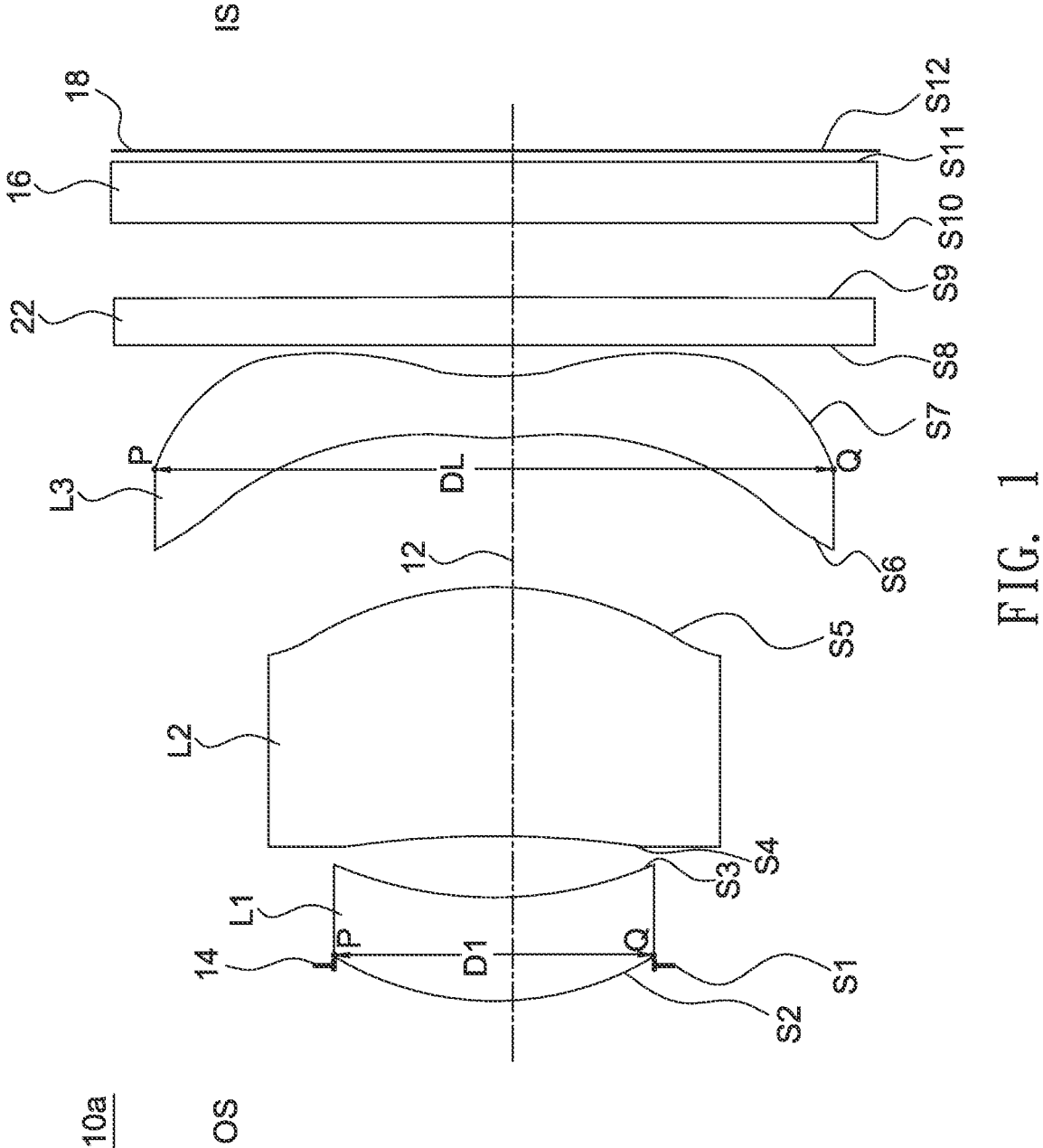
FIG. 1 shows a cross-sectional illustration of an imaging lens according to an embodiment of the invention.

FIG. 1 shows a cross-sectional illustration of an imaging lens according to a first embodiment of the invention. Referring to FIG. 1, in this embodiment, the imaging lens 10*a* is arranged between a magnified side (such as an object side) OS and a minified side (such as an image side) IS. The imaging lens 10*a* has a lens barrel (not shown) and inside the lens barrel an aperture stop 14, a lens L1, a lens L2, and a lens L3 are arranged from the magnified side OS to the minified side IS. The refractive powers of the lens L1, the lens L2, and the lens L3 are positive, positive, and negative, respectively. Furthermore, a sensor cover glass 16 and an image sensor (not shown) can be placed on the minified side IS. The cover glass 16 is for dust protection to protect the image sensor. An image plane (infrared focal plane) of the imaging lens 10*a* on the image sensor is marked as 18, and a filter (e.g., infrared bandpass filter) 22 can be placed between the lens L3 and the cover glass 16. In this embodiment, each of the lens L1, the lens L2 and the lens L3 is a singlet lens, the lens L1 is a glass spherical lens, and lens L2 and lens L3 are both aspheric lenses that can be made of plastic materials (e.g., PMMA or PC).

In each of the following embodiments, a total number of lenses with refractive powers of the imaging lens is at least three and at most five, and all lenses are not limited to have specific optical characteristic, shape and number and may vary according to actual demands. Besides, in each of the following embodiments, the magnified side (object side) OS is located on the left side and the minified side (image side) IS is located on the right side of each figure, and thus this is not repeatedly described in the following for brevity.

The aperture stop 14 may be an independent component or integrally formed with other optical element. In this embodiment, the aperture stop 14 may use a mechanic piece to block out peripheral light and transmit central light to achieve aperture effects. The mechanic piece may be adjusted by varying its position, shape or transmittance. In other embodiment, the aperture stop 14 may be formed by applying an opaque or a light-absorbing material on a lens surface except for a central area to block out peripheral light and transmits central light. In at least some embodiments of the invention, the aperture stop 14 can be disposed between the magnified side OS and the lens L2, and an F-number of the imaging lens ranges from 1.6 to 2.4. In this embodiment, an F-number of the imaging lens 10*a* is 2.0.

Detailed optical data and design parameters of the optical lens 10*a* are shown in Table 1 below. Note the data provided below are not used for limiting the invention, and those skilled in the art may suitably modify parameters or settings of the following embodiment with reference of the invention without departing from the scope or spirit of the invention.

Table 1 lists the values of parameters for each lens of an optical system, where the surface symbol denoted by an asterisk is an aspheric surface. Besides, the radius of curvature, thickness/interval and diameter shown in Table 1 are all in a unit of mm.

TABLE 1

| Object description | surface | Radius of curvature (mm) | Interval (mm) | Refractive index (nd) | Abbe number (Vd) |
|---|---|---|---|---|---|
| aperture stop 14 | S1 | INF | −0.244 | | |
| lens L1(meniscus) | S2 | 2.03 | 0.662 | 1.90 | 31 |
| | S3 | 2.57 | 0.415 | | |

TABLE 1-continued

| Object description | surface | Radius of curvature (mm) | Interval (mm) | Refractive index (nd) | Abbe number (Vd) |
|---|---|---|---|---|---|
| lens L2(aspheric) | S4* | −16.19 | 1.598 | 1.64 | 24 |
| | S5* | −2.23 | 0.968 | | |
| lens L3(aspheric) | S6* | 3.99 | 0.409 | 1.64 | 24 |
| | S7* | 1.64 | 0.199 | | |
| filter 22 | S8 | INF | 0.300 | 1.52 | 64 |
| | S9 | INF | 0.500 | | |
| cover glass 16 | S10 | INF | 0.400 | 1.52 | 64 |
| | S11 | INF | 0.045 | | |
| image plane 18 | S12 | INF | | | |

In the above Table 1, the field heading "interval" represents a distance between two adjacent surfaces along the optical axis 12 of the imaging lens 10*a*. For example, an interval of the surface S1 is a distance between the surface S1 and the surface S2 along the optical axis 12, an interval of the surface S2 is a distance between the surface S2 and the surface S3 along the optical axis 12.

Further, the interval, refractive index and Abbe number of any lens listed in the column of "Object description" show values in a horizontal row aligned with the position of that lens.

The surfaces S2 and S3 are two opposite lens surfaces of the lens L1, the surfaces S4 and S5 are two opposite lens surfaces of the lens L2, and the surfaces S6 and S7 are two opposite lens surfaces of the lens L3. The values of radius of curvature, interval and other parameter for each lens surface are shown in Table 1, so that related descriptions are omitted for sake of brevity. In this embodiment, a center part of the magnified-side surface S2 of the lens L1 is convex, and a center part of the minified-side surface S7 of the lens L3 is concave.

The radius of curvature is a reciprocal of the curvature. When a lens surface has a positive radius of curvature, the center of the lens surface is located towards the minified side. When a lens surface has a negative radius of curvature, the center of the lens surface is located towards the magnified side.

In at least some embodiments, the imaging lens may satisfy a condition of 0.07 mm<dBFL<0.17 mm, preferably 0.08 mm<dBFL<0.15 mm, and more preferably 0.10 mm<dBFL<0.13 mm. Herein, dBFL denotes a distance between a focal plane formed by light with a wavelength of 587 nm and a focal plane formed by light with a wavelength of 940 nm on an optical axis of the imaging lens when a subject to be captured is at infinity. Herein, the focal plane for 587 nm wavelength light may serve as a reference plane, and the focal plane for 940 nm wavelength light is farther away from the imaging lens as compared with the reference plane.

In at least some embodiments, the lens closest to the magnified side OS (e.g., lens L1) can be made of a material with a refractive index greater than 1.7 and an Abbe number less than 50. This may help to obtain a dBFL value of greater than 0.07 mm. In this embodiment, the value of dBFL of the imaging lens 10*a* is 0.12 mm.

Each lens may be assigned a parameter of "lens diameter". For example, as shown in FIG. 1, the lens L1 has an object-side surface S2 and an image-side surface S3, a light-transmitting area of a lens surface defines two outermost turning points P and Q at opposite ends of the optical axis 12, and a maximum distance between turning points P and Q in the direction perpendicular to the optical axis 12 is referred to as a lens diameter. In at least some embodiments, the imaging lens may satisfy a condition of 0.48<D1/DL<0.77, preferably 0.53<D1/DL<0.72, and more preferably 0.83<D1/DL<0.67, where D1 is a lens diameter of the lens (such as the lens L1) closest to the magnified side OS, and DL is a lens diameter of the lens (such as the lens L3) closest to the minified side IS. Meeting the above conditions may facilitate light converging capability of lenses to reduce the scope of image beams passing through lenses to match the size of a photosensor and thus allow for better optical performance in a limited space. In this embodiment, D1/DL=0.57.

In at least some embodiments, the imaging lens may satisfy a condition of 1<DL/LT<1.79, preferably 1.13<DL/LT<1.66, and more preferably 1.26<DL/LT<1.53, where DL is a lens diameter of the lens (such as the lens L3) closest to the minified side IS, and LT is a total lens length that is a distance measured along the optical axis 12 between a magnified-side surface of the lens closest to the magnified side OS (such as the surface S2 of the lens L1) and a minified-side surface of the lens closest to the minified side IS (such as the surface S7 of the lens L3). Assume the lens diameter DL is fixed, a larger total lens length LT makes miniaturization more difficult, while a shorter total lens length LT increases fabrication complexities. Therefore, meeting the above conditions may achieve a compromise between facilitation of miniaturization and reduction in fabrication complexities. In this embodiment, DL/LT=1.33.

In at least some embodiments, the imaging lens may satisfy a condition of 0.58<D1/LT<1.17, preferably 0.68<D1/LT<1.07, and more preferably 0.77<D1/LT<0.97, where D1 is a lens diameter of the lens (such as the lens L1) closest to the magnified side OS, and LT is a total lens length that is a distance along the optical axis 12 between a magnified-side surface of the lens closest to the magnified side OS (such as the surface S2 of the lens L1) and a minified-side surface of the lens closest to the minified side IS (such as the surface S7 of the lens L3). Meeting the above conditions may facilitate light converging capability of lenses to reduce the scope of image beams passing through lenses to match the size of a photosensor and thus allow for better optical performance in a limited space. In this embodiment, D1/LT=0.77.

In at least some embodiments, thermal drift of the imaging lens may be less than 15 μm, where the thermal drift is an offset of a focal plane at 105° C. relative to a focal plane at 25° C. of the imaging lens.

A horizontal field of view (HFOV) refers to a light collection angle of the optical surface closest to the magnified side OS; that is, the HFOV is a full field of view measured horizontally. In at least some embodiments, the horizontal field of view HFOV may range from 40 to 67 degrees, preferably from 45 to 62 degrees, and more preferably from 50 to 57 degrees. In this embodiment, a horizontal field of view of the imaging lens 10a is 50.4 degrees.

An aspheric lens indicates at least one of its front lens surface and rear lens surface has a radius of curvature that varies along a center axis to correct abbreviations. In the following design examples of the invention, each aspheric surface satisfies the following equation:

$$Z = \frac{cr^2}{1 + \sqrt{1 - (1 + k)c^2 r^2}} + Ar^4 + Br^6 + Cr^8 + Dr^{10} + Er^{12} + Fr^{14} + Gr^{16} + \ldots ,$$

where Z denotes a sag of an aspheric surface along the optical axis 12, c denotes a reciprocal of a radius of an osculating sphere, K denotes a Conic constant, r denotes a height of the aspheric surface measured in a direction perpendicular to the optical axis 12, and parameters A-G are 4th, 6th, 8th, 10th, 12th, 14th and 16th order aspheric coefficients. Note the data provided below are not used for limiting the invention, and those skilled in the art may suitably modify parameters or settings of the following embodiment with reference of the invention without departing from the scope or spirit of the invention.

TABLE 2

|  | S4* | S5* | S6* | S7* |
|---|---|---|---|---|
| K | 0.00 | −2.91 | −100.00 | −8.79 |
| A | −3.84E−02 | −3.65E−02 | −1.07E−01 | −7.70E−02 |
| B | −1.72E−02 | 9.33E−03 | −5.36E−03 | 1.79E−02 |
| C | 4.18E−02 | −2.84E−03 | 2.99E−02 | −3.89E−03 |
| D | −7.00E−02 | 4.39E−03 | −1.39E−02 | 5.45E−04 |
| E | 6.29E−02 | −2.90E−03 | 2.65E−03 | −8.97E−05 |
| F | −2.04E−02 | 9.28E−04 | −1.84E−04 | 6.68E−06 |
| G | 0.00E+00 | 0.00E+00 | 0.00E+00 | 0.00E+00 |

Figure 2:
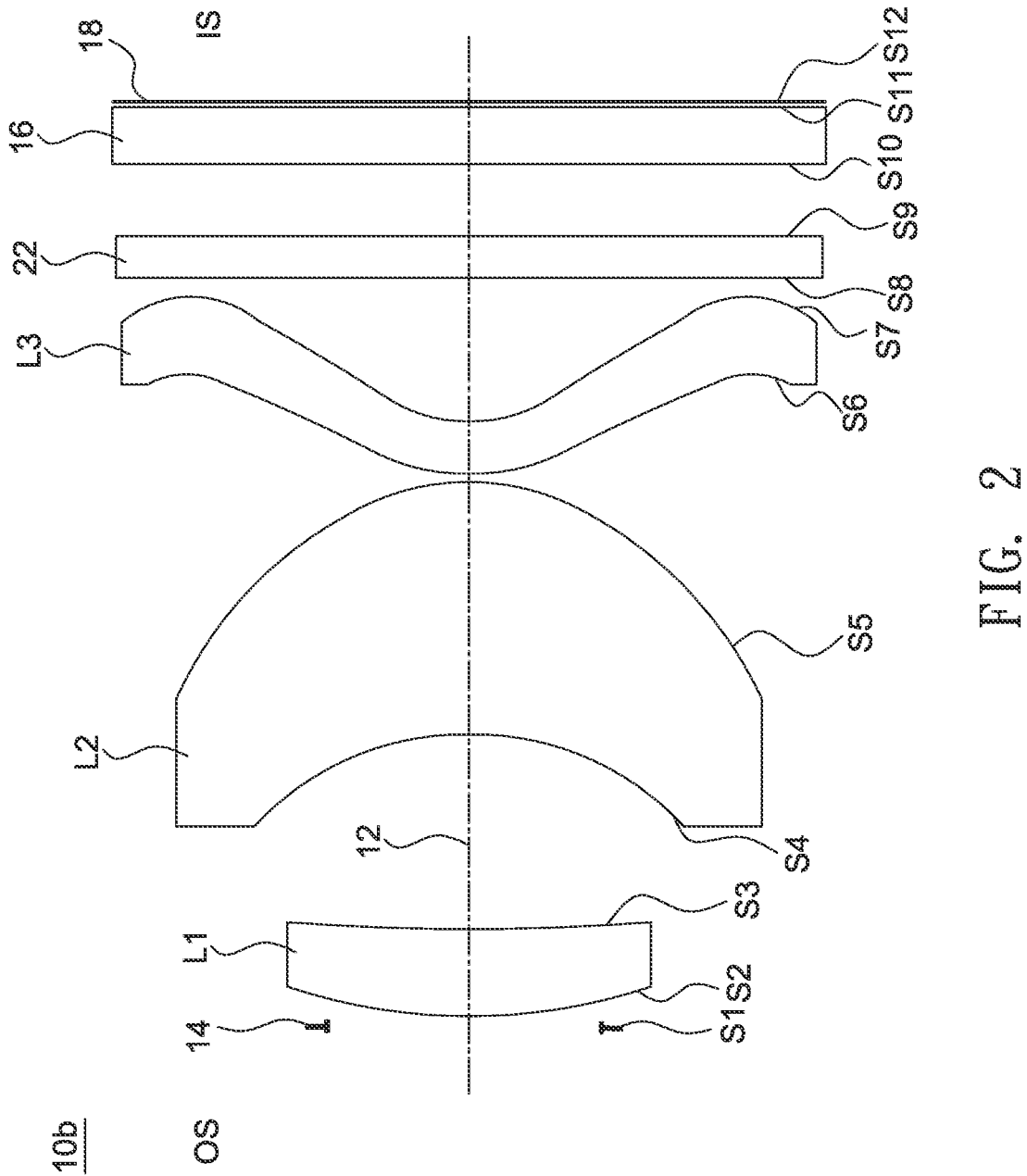
FIG. 2 shows a cross-sectional illustration of an imaging lens according to another embodiment of the invention.

FIG. 2 shows a cross-sectional illustration of an imaging lens according to a second embodiment of the invention. In this embodiment, the imaging lens 10b includes an aperture stop 14, a lens L1, a lens L2, and a lens L3 arranged in order from the magnified side OS to the minified side IS, and the refractive powers of lenses L1-L3 are positive, positive, and negative, respectively. In this embodiment, the lens L1 is a glass spherical lens, and lenses L2 and L3 are plastic aspheric lenses. In this embodiment, an effective focal length (EFL) of the imaging lens 10b is 3.78 mm, a horizontal field of view (HFOV) is 49.9 degrees, and an F-number of the imaging lens 10b is 2.0. A distance dBFL between the two focal planes on the optical axis respectively for 587 nm wavelength light and 940 nm wavelength light is 0.11 mm. Furthermore, in this embodiment, D1/DL=0.59, D1/LT=1.78 and DL/LT=1.31, where D1 is a lens diameter of the lens L1, DL is a lens diameter of the lens L3, and LT is a distance along the optical axis 12 between a magnified-side surface of the lens L1 and a minified-side surface of the lens L3. Detailed optical data and design parameters of the lenses and other optical components of the imaging lens 10b are shown in Table 3, and the conic coefficients and aspheric coefficients for each aspheric surface are shown in Table 4.

TABLE 3

| Object description | Surface | Radius of curvature (mm) | Interval (mm) | Refractive index (nd) | Abbe number (Vd) |
|---|---|---|---|---|---|
| aperture stop 14 | S1 | INF | 0.249 | | |
| lens L1 | S2 | 4.19 | 0.638 | 1.90 | 31 |
| (meniscus) | S3 | 16.86 | 1.357 | | |
| lens L2 | S4* | −2.88 | 1.812 | 1.64 | 24 |
| (aspheric) | S5* | −1.54 | 0.050 | | |
| lens L3 | S6* | 1.14 | 0.386 | 1.64 | 24 |
| (aspheric) | S7* | 0.82 | 1.012 | | |
| filter 22 | S8 | INF | 0.300 | 1.52 | 64 |
| | S9 | INF | 0.500 | | |

TABLE 3-continued

| Object description | Surface | Radius of curvature (mm) | Interval (mm) | Refractive index (nd) | Abbe number (Vd) |
|---|---|---|---|---|---|
| cover glass 16 | S10 | INF | 0.400 | 1.52 | 64 |
| | S11 | INF | 0.045 | | |
| image plane 18 | S12 | INF | | | |

TABLE 4

| | S4* | S5* | S6* | S7* |
|---|---|---|---|---|
| K | 0.63 | −3.15 | −1.79 | −1.77 |
| A | 8.29E−03 | −4.89E−02 | −4.31E−02 | −6.77E−02 |
| B | −4.19E−02 | 1.00E−02 | −8.70E−03 | 9.58E−03 |
| C | 2.74E−02 | −3.59E−03 | 7.32E−03 | 1.55E−04 |
| D | −1.26E−02 | 8.83E−04 | −1.80E−03 | −2.13E−04 |
| E | 3.21E−03 | −1.33E−04 | 2.12E−04 | 1.25E−05 |
| F | −3.64E−04 | 7.42E−06 | −1.14E−05 | 1.96E−07 |
| G | 0.00E+00 | 0.00E+00 | 0.00E+00 | 0.00E+00 |

Figure 3:
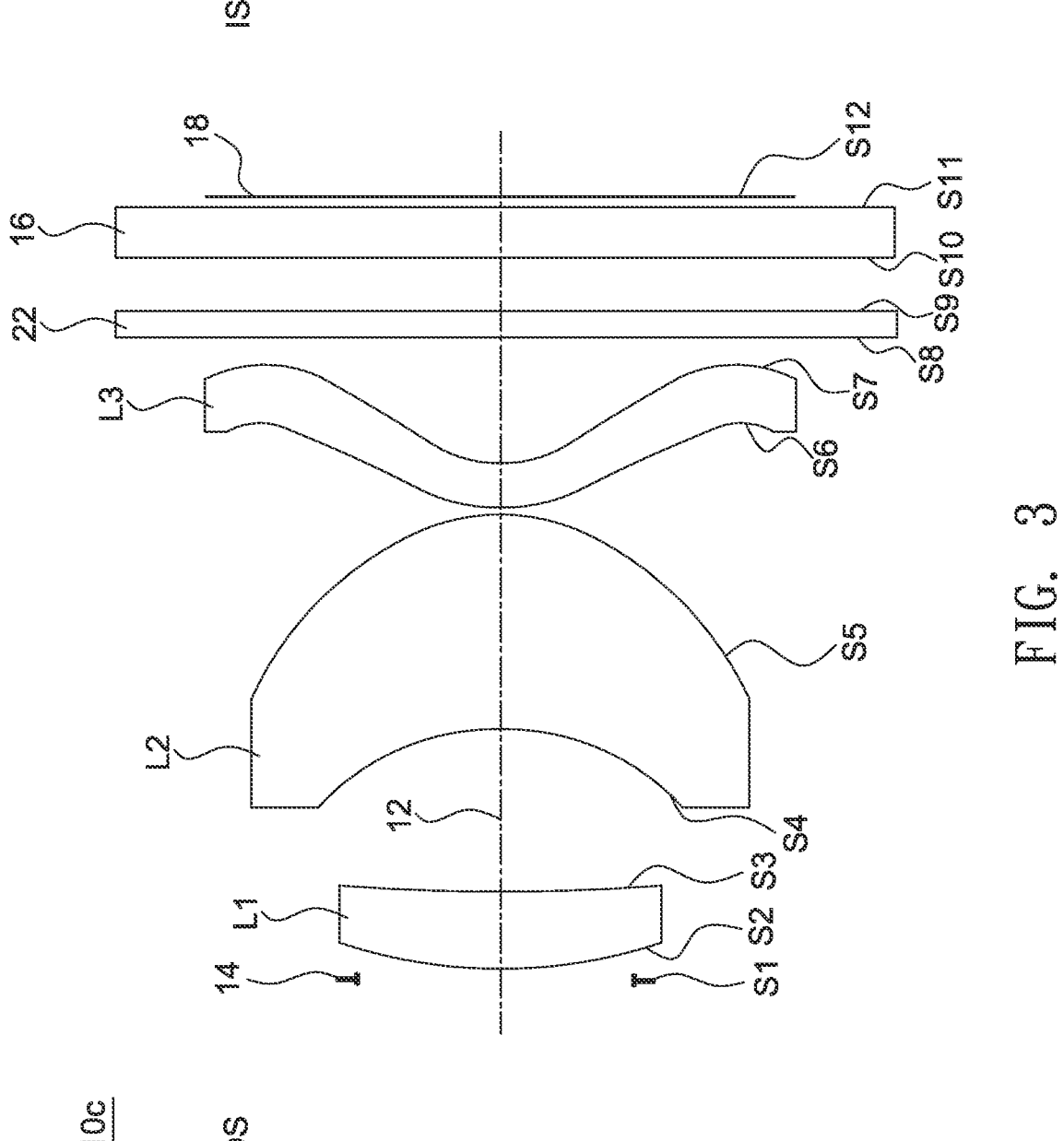
FIG. 3 shows a cross-sectional illustration of an imaging lens according to another embodiment of the invention.

FIG. 3 shows a cross-sectional illustration of an imaging lens according to a third embodiment of the invention. In this embodiment, the imaging lens 10c includes an aperture stop 14, a lens L1, a lens L2, and a lens L3 arranged in order from the magnified side OS to the minified side IS, and the refractive powers of lenses L1-L3 are positive, positive, and negative, respectively. In this embodiment, the lens L1 is a glass spherical lens, and the lenses L2 and L3 are plastic aspheric lenses. In this embodiment, an effective focal length (EFL) is 3.42 mm, a horizontal field of view (HFOV) is 54.4 degrees, and an F-number of the imaging lens 10c is 2.0. A distance dBFL between the two focal planes on the optical axis respectively for 587 nm wavelength light and 940 nm wavelength light is 0.10 mm. Furthermore, in this embodiment, D1/DL=0.62, D1/LT=0.83 and DL/LT=1.34, where D1 is a lens diameter of the lens L1, DL is a lens diameter of the lens L3, and LT is a distance along the optical axis 12 between a magnified-side surface of the lens L1 and a minified-side surface of the lens L3. Detailed optical data and design parameters of the lenses and other optical components of the imaging lens 10c are shown in Table 5, and the conic coefficients and aspheric coefficients for each aspheric surface are shown in Table 6.

TABLE 5

| Object description | Surface | Radius of curvature (mm) | Interval (mm) | Refractive index (nd) | Abbe number (Vd) |
|---|---|---|---|---|---|
| aperture stop 14 | S1 | INF | 0.225 | | |
| lens L1(meniscus) | S2 | 3.80 | 0.578 | 1.90 | 31 |
| | S3 | 15.27 | 1.229 | | |
| lens L2(aspheric) | S4* | −2.61 | 1.641 | 1.64 | 24 |
| | S5* | −1.39 | 0.045 | | |
| lens L3(aspheric) | S6* | 1.03 | 0.349 | 1.64 | 24 |
| | S7* | 0.74 | 0.982 | | |
| filter 22 | S8 | INF | 0.210 | 1.52 | 64 |
| | S9 | INF | 0.400 | | |
| cover glass 16 | S10 | INF | 0.400 | 1.52 | 64 |
| | S11 | INF | 0.045 | | |
| image plane 18 | S12 | INF | | | |

TABLE 6

| | S4* | S5* | S6* | S7* |
|---|---|---|---|---|
| K | 0.63 | −3.15 | −1.79 | −1.77 |
| A | 1.12E−02 | −6.59E−02 | −5.81E−02 | −9.12E−02 |

TABLE 6-continued

| | S4* | S5* | S6* | S7* |
|---|---|---|---|---|
| B | −6.88E−02 | 1.64E−02 | −1.43E−02 | 1.57E−02 |
| C | 5.48E−02 | −7.17E−03 | 1.47E−02 | 3.11E−04 |
| D | −3.08E−02 | 2.15E−03 | −4.39E−03 | −5.21E−04 |
| E | 9.55E−03 | −3.94E−04 | 6.29E−04 | 3.72E−05 |
| F | −1.32E−03 | 2.69E−05 | −4.12E−05 | 7.12E−07 |
| G | 0.00E+00 | 0.00E+00 | 0.00E+00 | 0.00E+00 |

Figure 4:
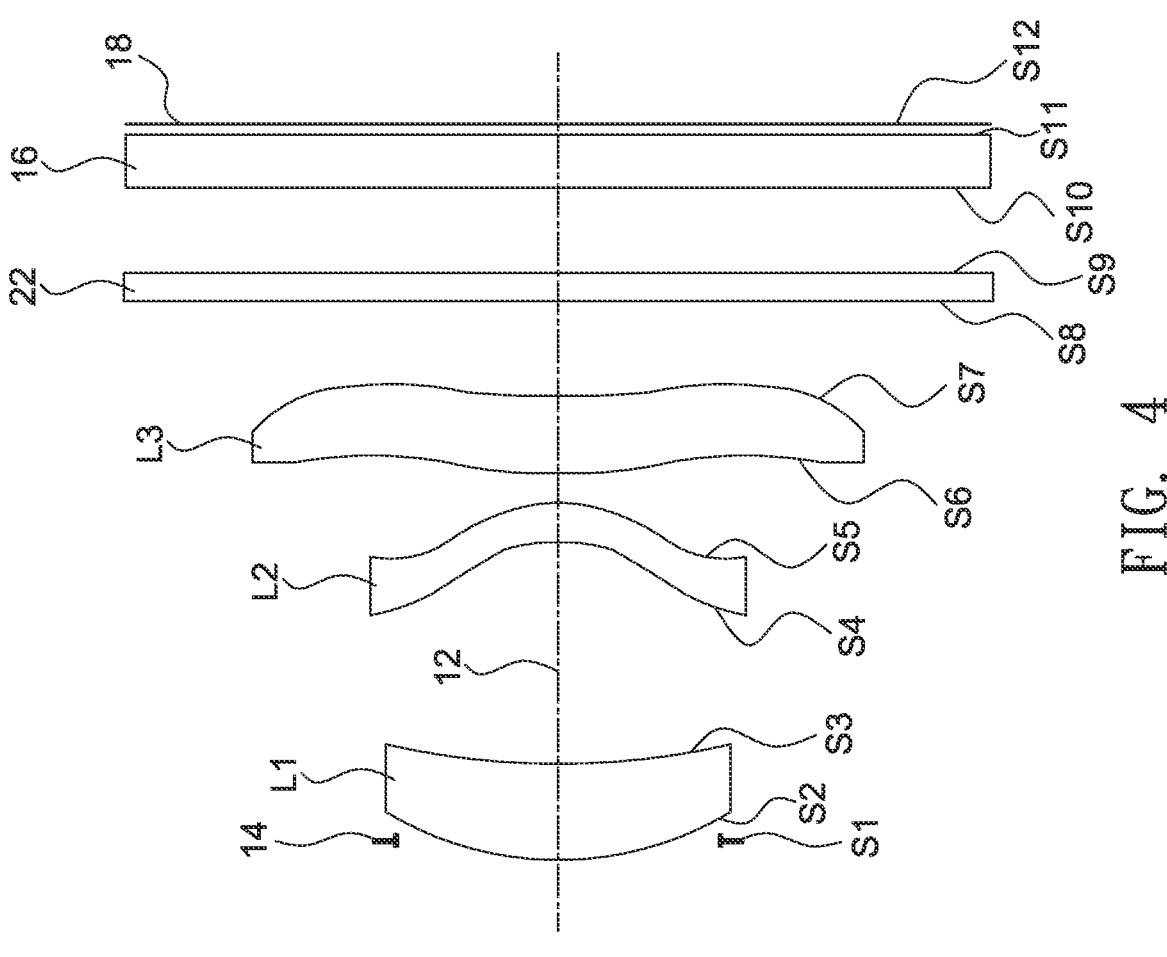
FIG. 4 shows a cross-sectional illustration of an imaging lens according to another embodiment of the invention.

FIG. 4 shows a cross-sectional illustration of an imaging lens according to a fourth embodiment of the invention. In this embodiment, the imaging lens 10d includes an aperture stop 14, a lens L1, a lens L2, and a lens L3 arranged in order from the magnified side OS to the minified side IS, and the refractive powers of lenses L1-L3 are positive, positive, and positive, respectively. In this embodiment, the lens L1 is a glass spherical lens, and the lenses L2 and L3 are plastic aspheric lenses. In this embodiment, an effective focal length (EFL) is 4.64 mm, a horizontal field of view (HFOV) is 50.0 degrees, and an F-number of the imaging lens 10d is 2.0. A distance dBFL between the two focal planes on the optical axis respectively for 587 nm wavelength light and 940 nm wavelength light is 0.10 mm. Furthermore, in this embodiment, D1/DL=0.64, D1/LT=1.07 and DL/LT=1.67, where D1 is a lens diameter of the lens L1, DL is a lens diameter of the lens L3, and LT is a distance along the optical axis 12 between a magnified-side surface of the lens L1 and a minified-side surface of the lens L3. Detailed optical data and design parameters of the lenses and other optical components of the imaging lens 10d are shown in Table 7, and the conic coefficients and aspheric coefficients for each aspheric surface are shown in Table 8.

TABLE 7

| Object description | Surface | Radius of curvature (mm) | Interval (mm) | Refractive index (nd) | Abbe number (Vd) |
|---|---|---|---|---|---|
| aperture stop 14 | S1 | INF | −0.181 | | |
| lens L1(meniscus) | S2 | 2.38 | 0.734 | 1.80 | 47 |
| | S3 | 5.96 | 1.665 | | |
| lens L2(aspheric) | S4* | −0.81 | 0.300 | 1.64 | 24 |
| | S5* | −0.90 | 0.221 | | |
| lens L3(aspheric) | S6* | 3.32 | 0.562 | 1.64 | 24 |
| | S7* | 3.20 | 0.723 | | |
| filter 22 | S8 | INF | 0.210 | 1.52 | 64 |
| | S9 | INF | 0.650 | | |
| cover glass 16 | S10 | INF | 0.400 | 1.52 | 64 |
| | S11 | INF | 0.045 | | |
| image plane 18 | S12 | INF | | | |

TABLE 8

| | S4* | S5* | S6* | S7* |
|---|---|---|---|---|
| K | −1.02 | −2.48 | 0.11 | −41.33 |
| A | 2.08E−01 | −7.56E−02 | −6.96E−02 | −1.39E−02 |
| B | −2.54E−01 | 9.38E−02 | 1.68E−02 | −1.34E−02 |
| C | 4.72E−01 | −6.26E−02 | −3.80E−03 | 1.18E−02 |
| D | −3.47E−01 | 1.79E−01 | 1.14E−03 | −5.29E−03 |
| E | 9.00E−02 | −1.77E−01 | −5.47E−04 | 1.31E−03 |
| F | 8.62E−03 | 7.25E−02 | 1.32E−04 | −1.80E−04 |
| G | −5.78E−03 | −1.09E−02 | −1.06E−05 | 1.06E−05 |

Figure 5:
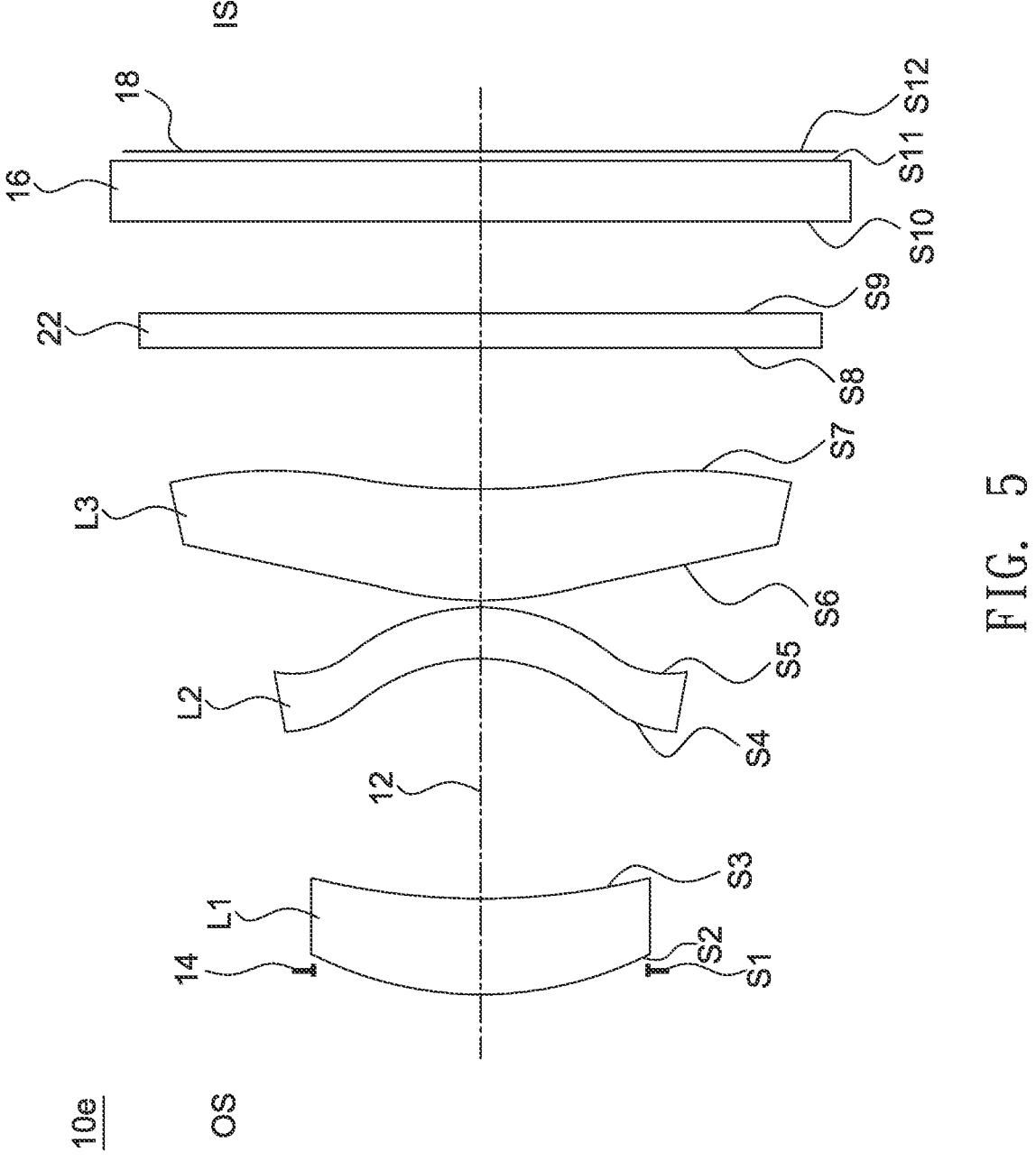
FIG. 5 shows a cross-sectional illustration of an imaging lens according to another embodiment of the invention.

FIG. 5 shows a cross-sectional illustration of an imaging lens according to a fifth embodiment of the invention. In this embodiment, the imaging lens 10e includes an aperture stop 14, a lens L1, a lens L2, and a lens L3 arranged in order from the magnified side OS to the minified side IS, and the refractive powers of lenses L1-L3 are positive, positive, and positive, respectively. In this embodiment, the lens L1 is a glass spherical lens, and the lenses L2 and L3 are plastic aspheric lenses. In this embodiment, an effective focal length (EFL) is 4.34 mm, a horizontal field of view (HFOV) is 43.8 degrees, and an F-number of the imaging lens 10e is 2.0. A distance dBFL between the two focal planes on the optical axis respectively for 587 nm wavelength light and 940 nm wavelength light is 0.12 mm. Furthermore, in this embodiment, D1/DL=0.63, D1/LT=0.98 and DL/LT=1.55, where D1 is a lens diameter of the lens L1, DL is a lens diameter of the lens L3, and LT is a distance along the optical axis 12 between a magnified-side surface of the lens L1 and a minified-side surface of the lens L3. Detailed optical data and design parameters of the lenses and other optical components of the imaging lens 10e are shown in Table 9, and the conic coefficients and aspheric coefficients for each aspheric surface are shown in Table 10.

TABLE 9

| Object description | Surface | Radius of curvature (mm) | Interval (mm) | Refractive index (nd) | Abbe number (Vd) |
|---|---|---|---|---|---|
| aperture stop 14 | S1 | INF | −0.214 | | |
| lens L1(meniscus) | S2 | 2.49 | 0.636 | 1.90 | 31 |
| | S3 | 4.89 | 1.583 | | |
| lens L2(aspheric) | S4* | −0.89 | 0.336 | 1.64 | 24 |
| | S5* | −0.92 | 0.040 | | |
| lens L3(aspheric) | S6* | 3.12 | 0.715 | 1.64 | 24 |
| | S7* | 2.89 | 0.939 | | |
| filter 22 | S8 | INF | 0.210 | 1.52 | 64 |
| | S9 | INF | 0.600 | | |
| cover glass 16 | S10 | INF | 0.400 | 1.52 | 64 |
| | S11 | INF | 0.045 | | |
| image plane 18 | S12 | INF | | | |

TABLE 10

| | S4* | S5* | S6* | S7* |
|---|---|---|---|---|
| K | −1.55 | −1.99 | −0.28 | −31.89 |
| A | 3.62E−02 | −1.10E−02 | −4.66E−02 | −2.05E−02 |
| B | −6.09E−02 | −2.08E−02 | 2.04E−02 | 9.73E−03 |
| C | 2.10E−01 | 1.23E−01 | −8.12E−03 | −3.99E−03 |
| D | −1.62E−01 | −7.20E−02 | 1.88E−03 | 6.97E−04 |
| E | 5.13E−02 | 1.69E−02 | −2.24E−04 | −5.63E−05 |

TABLE 10-continued

| | S4* | S5* | S6* | S7* |
|---|---|---|---|---|
| F | −6.10E−03 | −1.49E−03 | 1.06E−05 | 1.56E−06 |
| G | 0.00E+00 | 0.00E+00 | 0.00E+00 | 0.00E+00 |

Figure 6:
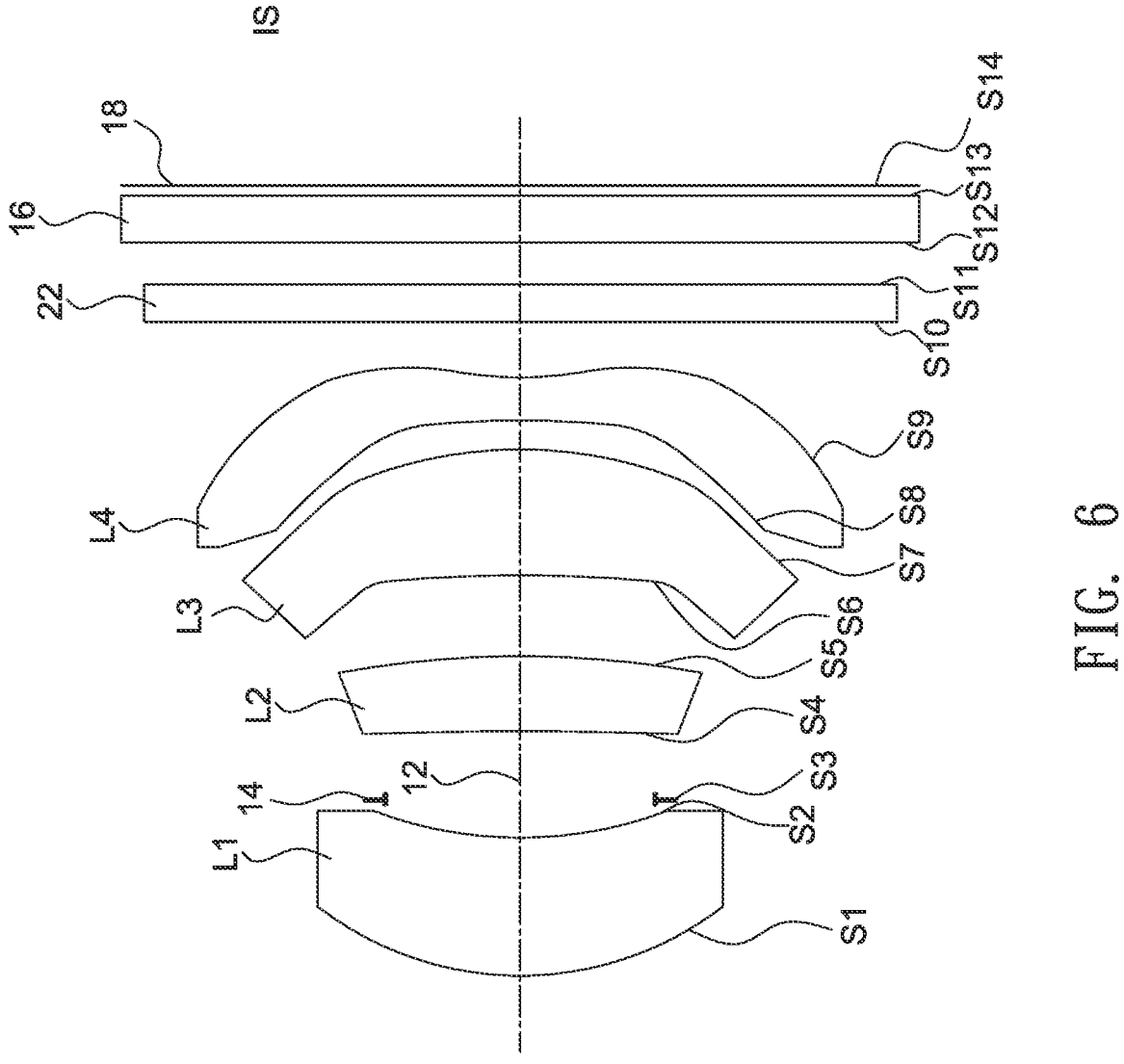
FIG. 6 shows a cross-sectional illustration of an imaging lens according to another embodiment of the invention.

FIG. 6 shows a cross-sectional illustration of an imaging lens according to a sixth embodiment of the invention. In this embodiment, the imaging lens 10f includes a lens L1, an aperture stop 14, a lens L2, a lens L3 and a lens L4 arranged in order from the magnified side OS to the minified side IS, and the refractive powers of lenses L1-L4 are positive, positive, positive and negative, respectively. In this embodiment, the lens L1 is a glass spherical lens, and lenses L2, L3 and L4 are plastic aspheric lenses. In this embodiment, an effective focal length (EFL) is 5.49 mm, a horizontal field of view (HFOV) is 49.9 degrees, and an F-number of the imaging lens 10f is 2.0. A distance dBFL between the two focal planes on the optical axis respectively for 587 nm wavelength light and 940 nm wavelength light is 0.15 mm. Furthermore, in this embodiment, D1/DL=0.69, D1/LT=0.88 and DL/LT=1.27, where D1 is a lens diameter of the lens L1, DL is a lens diameter of the lens L4, and LT is a distance along the optical axis 12 between a magnified-side surface of the lens L1 and a minified-side surface of the lens L4. Detailed optical data and design parameters of the lenses and other optical components of the imaging lens 10f are shown in Table 11, and the conic coefficients and aspheric coefficients for each aspheric surface are shown in Table 12.

TABLE 11

| Object description | Surface | Radius of curvature (mm) | Interval (mm) | Refractive index (nd) | Abbe number (Vd) |
|---|---|---|---|---|---|
| lens L1(meniscus) | S1 | 2.72 | 0.100 | | |
| | S2 | 3.64 | 1.181 | 2.00 | 29 |
| aperture stop 14 | S3 | INF | 0.277 | | |
| lens L2(aspheric) | S4* | 27.06 | 0.583 | 1.64 | 24 |
| | S5* | −23.20 | 0.614 | | |
| lens L3(aspheric) | S6* | −85.43 | 0.682 | 1.64 | 24 |
| | S7* | −2.74 | 1.076 | | |
| lens L4(aspheric) | S8* | −166.24 | 0.202 | 1.64 | 24 |
| | S9* | 2.15 | 0.359 | | |
| filter 22 | S10 | INF | 0.500 | 1.52 | 64 |
| | S11 | INF | 0.300 | | |
| cover glass 16 | S12 | INF | 0.400 | 1.52 | 64 |
| | S13 | INF | 0.045 | | |
| image plane 18 | S14 | INF | | | |

TABLE 12

| | S4* | S5* | S6* | S7* | S8* | S9* |
|---|---|---|---|---|---|---|
| K | 0.00 | 0.00 | 0.00 | −3.60 | 0.00 | −1.15 |
| A | −8.62E−03 | −2.22E−02 | 1.04E−02 | 1.27E−01 | 1.90E−03 | −1.44E−01 |
| B | −6.15E−02 | −7.50E−03 | −1.86E−02 | −1.38E−01 | −1.08E−01 | 3.07E−02 |
| C | 9.75E−02 | −1.37E−03 | −9.44E−03 | 6.52E−02 | 4.77E−02 | −6.55E−03 |
| D | −9.10E−02 | 3.62E−03 | 1.24E−02 | −1.89E−02 | −8.55E−03 | 1.48E−03 |
| E | 4.31E−02 | −1.98E−03 | −5.69E−03 | 3.01E−03 | 7.20E−04 | −2.09E−04 |
| F | −7.77E−03 | 6.09E−04 | 8.32E−04 | −1.92E−04 | −2.38E−05 | 1.15E−05 |
| G | 0.00E+00 | 0.00E+00 | 0.00E+00 | 0.00E+00 | 0.00E+00 | 0.00E+00 |

Figure 7:
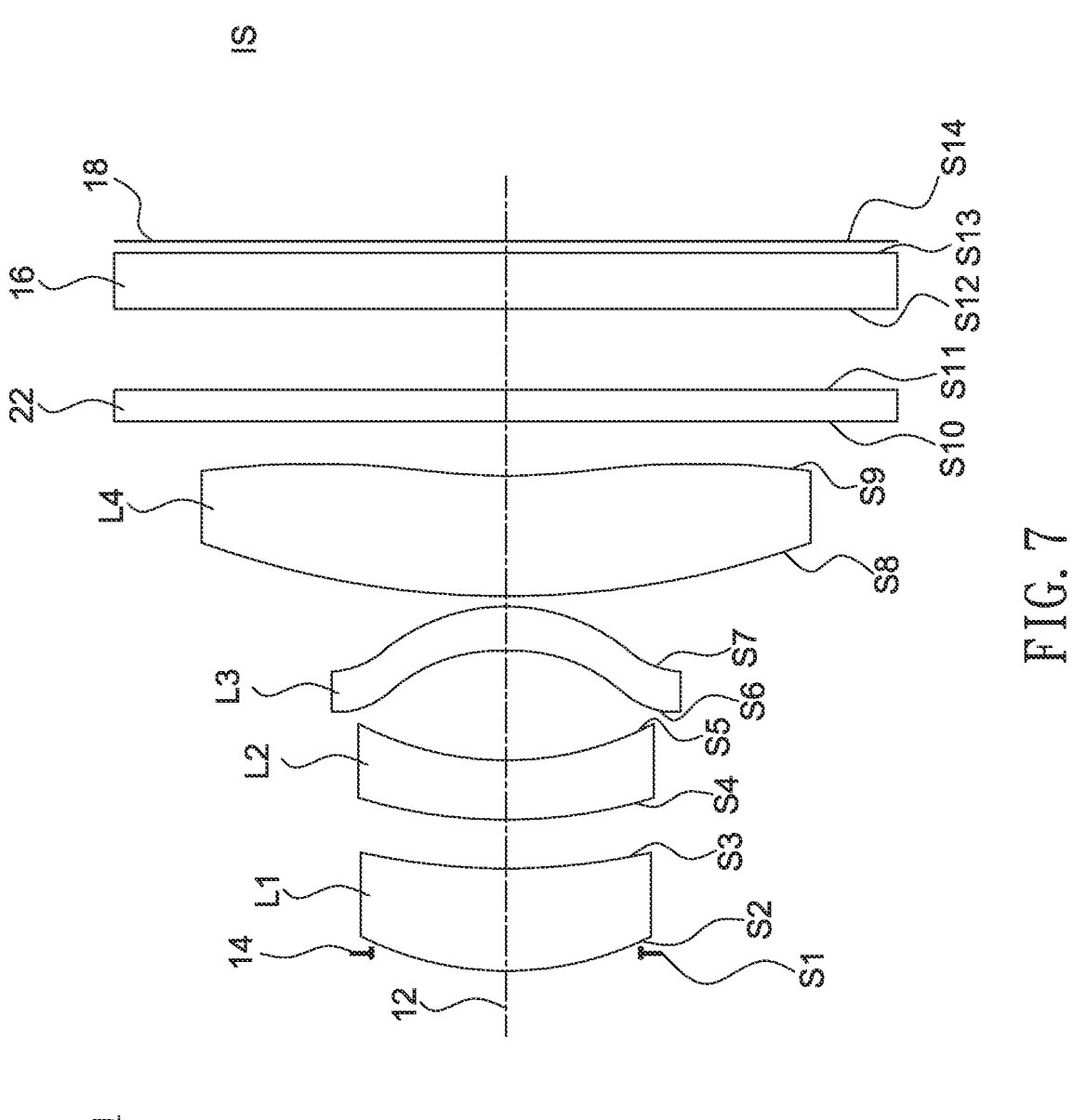
FIG. 7 shows a cross-sectional illustration of an imaging lens according to another embodiment of the invention.

FIG. 7 shows a cross-sectional illustration of an imaging lens according to a seventh embodiment of the invention. In this embodiment, the imaging lens 10g includes an aperture stop 14, a lens L1, a lens L2, a lens L3 and a lens L4 arranged in order from the magnified side OS to the minified side IS, and the refractive powers of lenses L1-L4 are positive, negative, positive and positive, respectively. In this embodiment, the lens L1 is a glass spherical lens, and the lenses L2, L3 and L4 are plastic aspheric lenses. In this embodiment, an effective focal length (EFL) is 3.55 mm, a horizontal field of view (HFOV) is 50.0 degrees, and an F-number of the imaging lens 10g is 2.0. A distance dBFL between the two focal planes on the optical axis respectively for 587 nm wavelength light and 940 nm wavelength light is 0.09 mm. Furthermore, in this embodiment, D1/DL=0.59, D1/LT=0.90 and DL/LT=1.54, where D1 is a lens diameter of the lens L1, DL is a lens diameter of the lens L4, and LT is a distance along the optical axis 12 between a magnified-side surface of the lens L1 and a minified-side surface of the lens L4. Detailed optical data and design parameters of the lenses and other optical components of the imaging lens 10g are shown in Table 13, and the conic coefficients and aspheric coefficients for each aspheric surface are shown in Table 14.

2.0. A distance dBFL between the two focal planes on the optical axis respectively for 587 nm wavelength light and 940 nm wavelength light is 0.12 mm. Furthermore, in this embodiment, D1/DL=0.70, D1/LT=0.85 and DL/LT=1.23, where D1 is a lens diameter of the lens L1, DL is a lens diameter of the lens L3, and LT is a distance along the optical axis 12 between a magnified-side surface of the lens L1 and a minified-side surface of the lens L3. Detailed optical data and design parameters of the lenses and other optical components of the imaging lens 10h are shown in Table 15, and the conic coefficients and aspheric coefficients for each aspheric surface are shown in Table 16.

TABLE 13

| Object description | Surface | Radius of curvature (mm) | Interval (mm) | Refractive index (nd) | Abbe number (Vd) |
|---|---|---|---|---|---|
| aperture stop 14 | S1 | INF | −0.3 | | |
| lens L1(meniscus) | S2 | 2.05 | 0.677 | 1.90 | 31 |
| | S3 | 4.47 | 0.295 | | |
| lens L2(aspheric) | S4* | 3.93 | 0.375 | 1.64 | 24 |
| | S5* | 2.80 | 0.704 | | |
| lens L3(aspheric) | S6* | −0.98 | 0.300 | 1.64 | 24 |
| | S7* | −1.00 | 0.050 | | |
| lens L4(aspheric) | S8* | 3.01 | 0.769 | 1.64 | 24 |
| | S9* | 3.51 | 0.348 | | |
| filter 22 | S10 | INF | 0.210 | 1.52 | 64 |
| | S11 | INF | 0.500 | | |
| cover glass 16 | S12 | INF | 0.400 | 1.52 | 64 |
| | S13 | INF | 0.045 | | |
| image plane 18 | S14 | INF | | | |

TABLE 15

| Object description | Surface | Radius of curvature (mm) | Interval (mm) | Refractive index (nd) | Abbe number (Vd) |
|---|---|---|---|---|---|
| lens L1(meniscus) | S1 | 2.10 | 0.755 | 1.90 | 31 |
| | S2 | 2.71 | 0.199 | | |
| aperture stop 14 | S3 | INF | 0.220 | | |
| lens L2(aspheric) | S4* | −15.03 | 1.598 | 1.64 | 24 |
| | S5* | −2.20 | 0.968 | | |
| lens L3(aspheric) | S6* | 3.64 | 0.329 | 1.64 | 24 |
| | S7* | 1.64 | 0.186 | | |
| filter 22 | S8 | INF | 0.300 | 1.52 | 64 |
| | S9 | INF | 0.500 | | |
| cover glass 16 | S10 | INF | 0.400 | 1.52 | 64 |
| | S11 | INF | 0.045 | | |
| image plane 18 | S12 | INF | | | |

TABLE 16

| | S4* | S5* | S6* | S7* |
|---|---|---|---|---|
| K | 0.00 | −3.38 | −100.00 | −10.09 |
| A | −3.68E−02 | −3.85E−02 | −1.07E−01 | −7.50E−02 |
| B | −1.72E−02 | 8.53E−03 | −6.53E−03 | 1.52E−02 |
| C | 4.18E−02 | −2.13E−03 | 2.99E−02 | −3.37E−03 |
| D | −7.00E−02 | 4.27E−03 | −1.39E−02 | 5.45E−04 |
| E | 6.29E−02 | −2.90E−03 | 2.65E−03 | −1.10E−04 |
| F | −2.04E−02 | 9.28E−04 | −1.87E−04 | 6.68E−06 |
| G | 0.00E+00 | 0.00E+00 | 0.00E+00 | 0.00E+00 |

Figure 9:
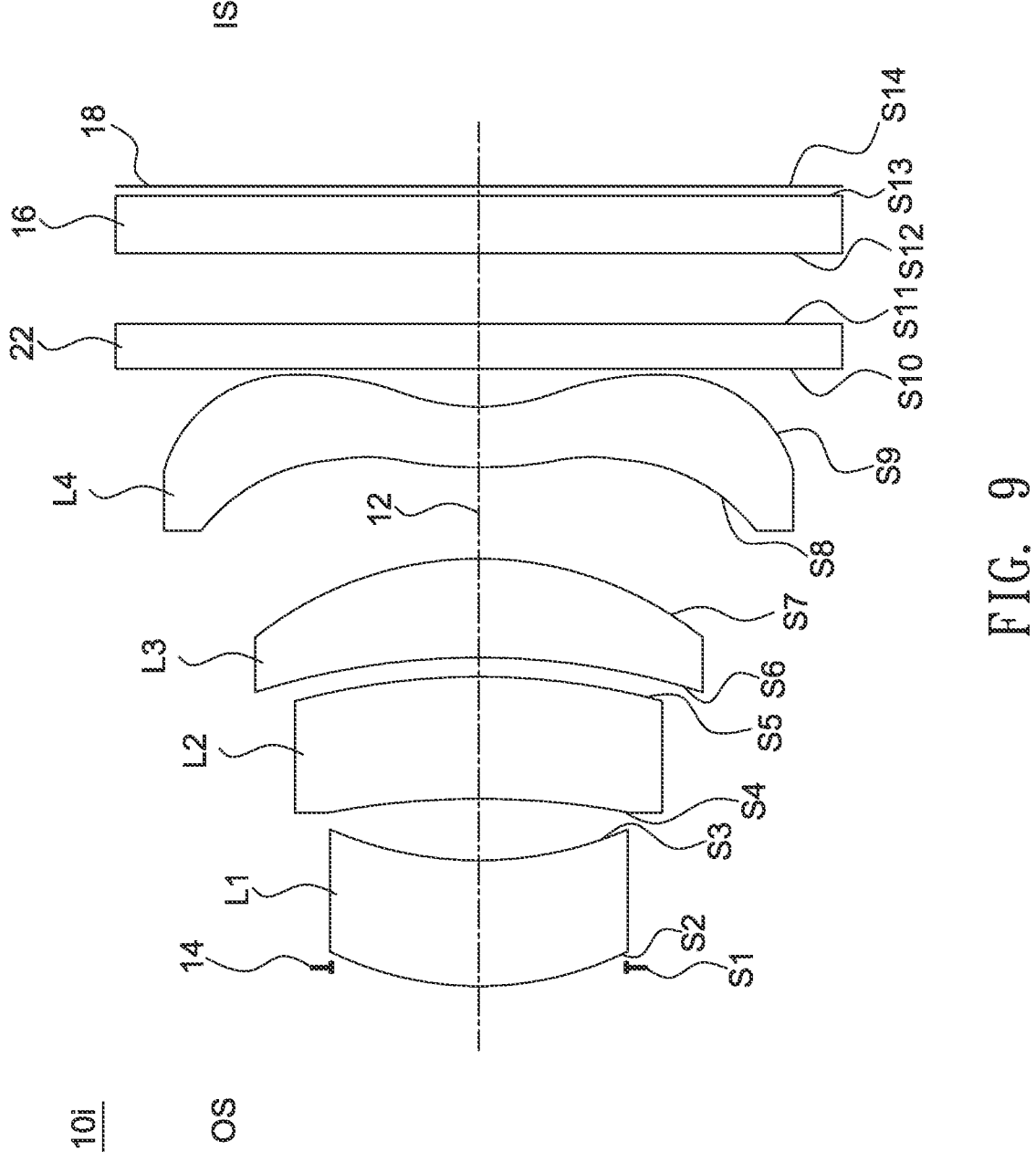
FIG. 9 shows a cross-sectional illustration of an imaging lens according to another embodiment of the invention.

FIG. 9 shows a cross-sectional illustration of an imaging lens according to a ninth embodiment of the invention. In

TABLE 14

| | S4* | S5* | S6* | S7* | S8* | S9* |
|---|---|---|---|---|---|---|
| K | 0.00 | 0.00 | −0.90 | −7.49 | 0.39 | 0.73 |
| A | 1.53E−02 | 5.17E−02 | 8.98E−02 | −7.45E−01 | −1.50E−01 | −1.11E−01 |
| B | 1.85E−02 | −9.02E−03 | −2.36E−01 | 1.59E+00 | 1.10E−01 | 5.09E−02 |
| C | −1.38E−02 | 7.75E−02 | −4.67E−01 | −3.12E+00 | −5.02E−02 | −2.34E−02 |
| D | −3.69E−03 | 1.40E−02 | 2.75E+00 | 4.14E+00 | 1.50E−02 | 8.19E−03 |
| E | 3.08E−02 | −8.28E−02 | −3.03E+00 | −2.65E+00 | −2.74E−03 | −1.63E−03 |
| F | −2.84E−02 | 3.13E−02 | 1.03E+00 | 6.35E−01 | 2.23E−04 | 1.29E−04 |
| G | 0.00E+00 | 0.00E+00 | 0.00E+00 | 0.00E+00 | 0.00E+00 | 0.00E+00 |

Figure 8:
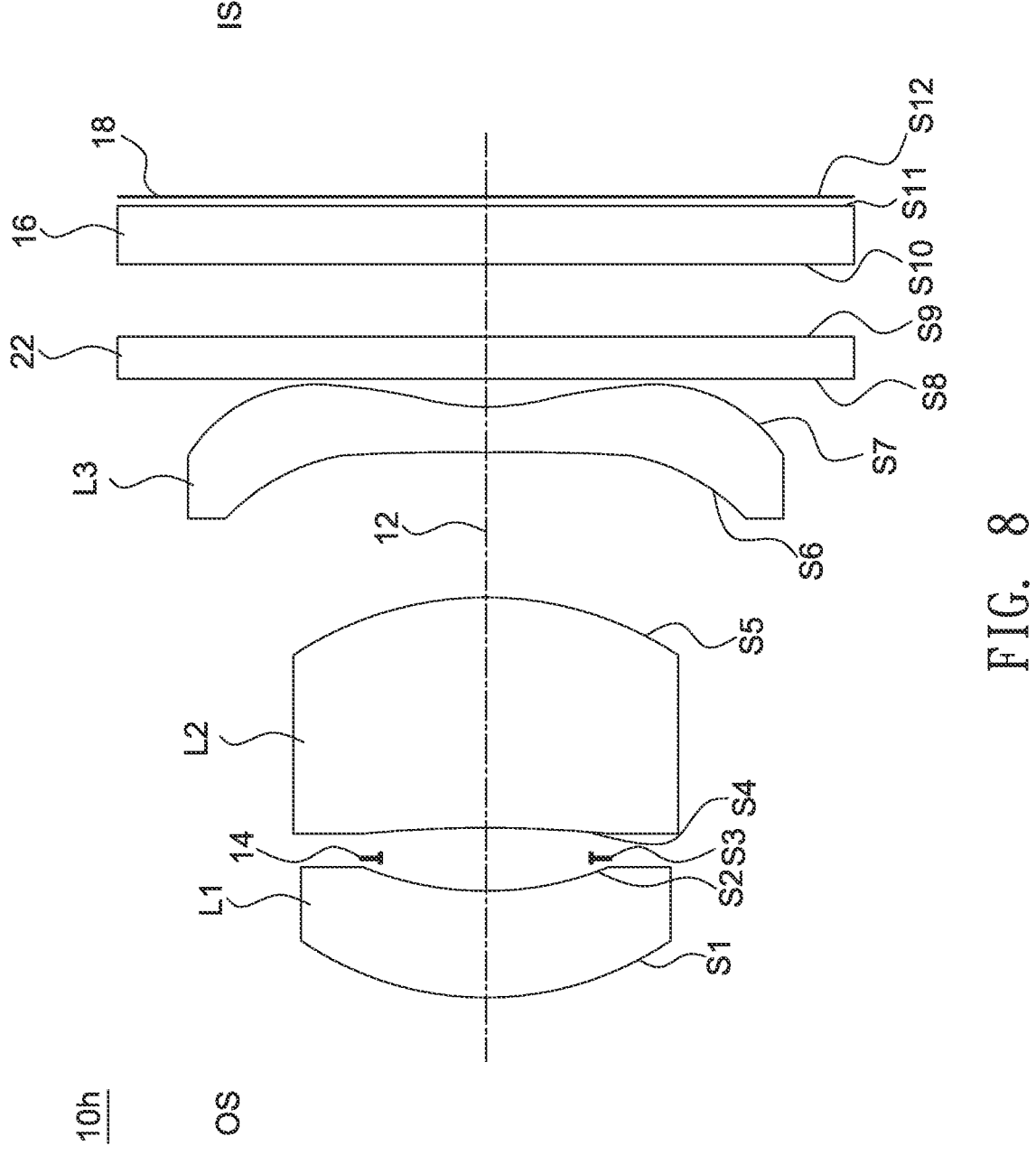
FIG. 8 shows a cross-sectional illustration of an imaging lens according to another embodiment of the invention.

FIG. 8 shows a cross-sectional illustration of an imaging lens according to an eighth embodiment of the invention. In this embodiment, the imaging lens 10h includes a lens L1, an aperture stop 14, a lens L2 and a lens L3 arranged in order from the magnified side OS to the minified side IS, and the refractive powers of lenses L1-L3 are positive, positive and negative, respectively. In this embodiment, the lens L1 is a glass spherical lens, and lenses L2 and L3 are plastic aspheric lenses. In this embodiment, an effective focal length (EFL) is 3.97 mm, a horizontal field of view (HFOV) is 50.4 degrees, and an F-number of the imaging lens 10h is this embodiment, the imaging lens 10i includes an aperture stop 14, a lens L1, a lens L2, a lens L3 and a lens L4 arranged in order from the magnified side OS to the minified side IS, and the refractive powers of lenses L1-L4 are positive, positive, positive and negative, respectively. In this embodiment, the lens L1 is a glass spherical lens, and the lenses L2, L3 and L4 are plastic aspheric lenses. In this embodiment, an effective focal length (EFL) is 3.98 mm, a horizontal field of view (HFOV) is 50.3 degrees, and an F-number of the imaging lens 10i is 2.0. A distance dBFL between the two focal planes on the optical axis respectively for 587 nm wavelength light and 940 nm wavelength light is 0.12 mm. Furthermore, in this embodiment, D1/DL=0.58, D1/LT=0.76 and DL/LT=1.33, where D1 is a lens diameter of the lens L1, DL is a lens diameter of the lens L4, and LT is a distance along the optical axis 12 between a magnified-side surface of the lens L1 and a minified-side surface of the lens L4. Detailed optical data and design parameters of the lenses and other optical components of the imaging lens 10*i* are shown in Table 17, and the conic coefficients and aspheric coefficients for each aspheric surface are shown in Table 18.

TABLE 17

| Object description | Surface | Radius of curvature (mm) | Interval (mm) | Refractive index (nd) | Abbe number (Vd) |
|---|---|---|---|---|---|
| aperture stop 14 | S1 | INF | −0.229 | | |
| lens L1(meniscus) | S2 | 2.11 | 0.887 | 1.90 | 31 |
| | S3 | 2.61 | 0.405 | | |
| lens L2(aspheric) | S4* | −15.40 | 0.853 | 1.64 | 24 |
| | S5* | −3.61 | 0.127 | | |
| lens L3(aspheric) | S6* | −4.00 | 0.690 | 1.64 | 24 |
| | S7* | −2.31 | 0.622 | | |
| lens L4(aspheric) | S8* | 2.38 | 0.411 | 1.64 | 24 |
| | S9* | 1.30 | 0.269 | | |
| filter 22 | S10 | INF | 0.300 | 1.52 | 64 |
| | S11 | INF | 0.500 | | |
| cover glass 16 | S12 | INF | 0.400 | 1.52 | 64 |
| | S13 | INF | 0.045 | | |
| image plane 18 | S14 | INF | | | |

TABLE 18

| | S4* | S5* | S6* | S7* | S8* | S9* |
|---|---|---|---|---|---|---|
| K | 0.00 | 0.00 | 0.00 | −2.20 | −18.19 | −5.20 |
| A | −4.44E−02 | −1.48E−02 | 9.69E−04 | −2.46E−02 | −1.09E−01 | −8.76E−02 |
| B | −2.12E−02 | 5.94E−03 | 1.79E−03 | 7.77E−03 | −8.07E−03 | 1.86E−02 |
| C | 6.15E−02 | 1.11E−02 | 4.87E−04 | −6.27E−03 | 3.03E−02 | −1.02E−03 |
| D | −7.98E−02 | 0.00E+00 | 0.00E+00 | 4.07E−03 | −1.39E−02 | −1.15E−03 |
| E | 6.54E−02 | 0.00E+00 | 0.00E+00 | −2.50E−03 | 2.59E−03 | 2.80E−04 |
| F | −2.11E−02 | 0.00E+00 | 0.00E+00 | 6.04E−04 | −1.73E−04 | −2.28E−05 |
| G | 0.00E+00 | 0.00E+00 | 0.00E+00 | 0.00E+00 | 0.00E+00 | 0.00E+00 |

Figure 10:
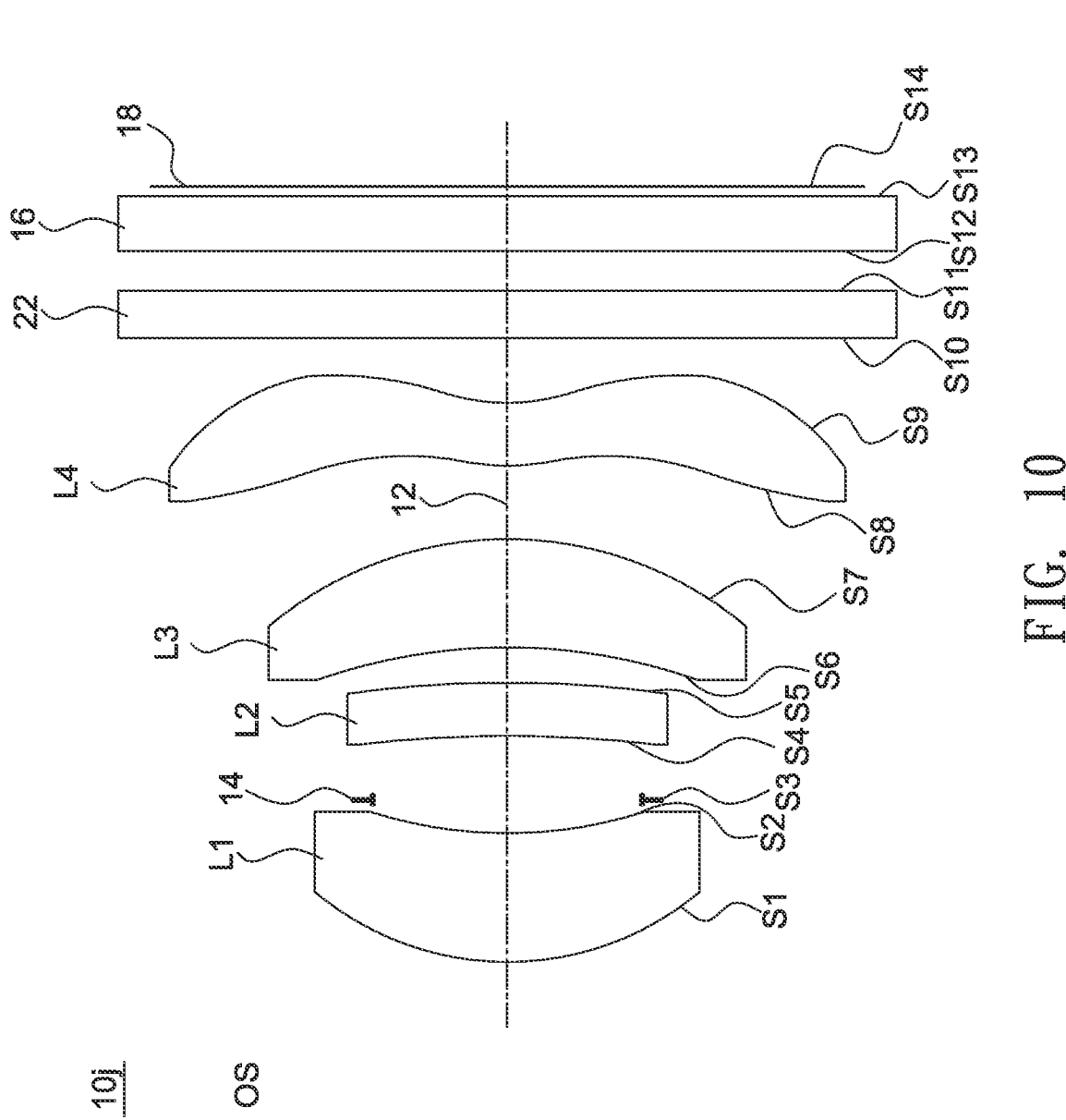
FIG. 10 shows a cross-sectional illustration of an imaging lens according to another embodiment of the invention.

FIG. 10 shows a cross-sectional illustration of an imaging lens according to a tenth embodiment of the invention. In this embodiment, the imaging lens 10*j* includes a lens L1, an aperture stop 14, a lens L2, a lens L3 and a lens L4 arranged in order from the magnified side OS to the minified side IS, and the refractive powers of lenses L1-L4 are positive, positive, positive and negative, respectively. In this embodiment, the lens L1 is a glass spherical lens, and lenses L2, L3 and L4 are plastic aspheric lenses. In this embodiment, an effective focal length (EFL) is 3.96 mm, a horizontal field of view (HFOV) is 50.3 degrees, and an F-number of the imaging lens 10*j* is 2.0. A distance dBFL between the two focal planes on the optical axis respectively for 587 nm wavelength light and 940 nm wavelength light is 0.09 mm. Furthermore, in this embodiment, D1/DL=0.65, D1/LT=0.97 and DL/LT=1.48, where D1 is a lens diameter of the lens L1, DL is a lens diameter of the lens L4, and LT is a distance along the optical axis 12 between a magnified-side surface of the lens L1 and a minified-side surface of the lens L4. Detailed optical data and design parameters of the lenses and other optical components of the imaging lens 10*j* are shown in Table 19, and the conic coefficients and aspheric coefficients for each aspheric surface are shown in Table 20.

TABLE 19

| Object description | Surface | Radius of curvature (mm) | Interval (mm) | Refractive index (nd) | Abbe number (Vd) |
|---|---|---|---|---|---|
| lens L1(meniscus) | S1 | 1.89 | 0.822 | 1.88 | 41 |
| | S2 | 2.61 | 0.197 | | |
| aperture stop 14 | S3 | INF | 0.438 | | |
| lens L2(aspheric) | S4* | −35.85 | 0.324 | 1.64 | 24 |
| | S5* | −22.06 | 0.244 | | |
| lens L3(aspheric) | S6* | −17.75 | 0.690 | 1.64 | 24 |
| | S7* | −3.32 | 0.490 | | |
| lens L4(aspheric) | S8* | 2.34 | 0.406 | 1.64 | 24 |
| | S9* | 1.45 | 0.397 | | |
| filter 22 | S10 | INF | 0.300 | 1.52 | 64 |
| | S11 | INF | 0.250 | | |
| cover glass 16 | S12 | INF | 0.400 | 1.52 | 64 |
| | S13 | INF | 0.045 | | |
| image plane 18 | S14 | INF | | | |

TABLE 20

|  | S4* | S5* | S6* | S7* | S8* | S9* |
|---|---|---|---|---|---|---|
| K | 0.00 | 0.00 | 0.00 | 3.49 | −12.30 | −4.83 |
| A | −8.45E−02 | −9.01E−02 | −5.26E−02 | −3.24E−02 | −1.51E−01 | −1.26E−01 |
| B | −3.64E−02 | −4.09E−02 | −6.84E−02 | 4.93E−03 | 5.19E−03 | 3.69E−02 |
| C | 7.02E−02 | 6.88E−02 | 2.95E−02 | −6.78E−03 | 3.35E−02 | −6.56E−03 |
| D | −1.78E−03 | 1.47E−02 | 1.72E−02 | 1.29E−02 | −1.41E−02 | −4.05E−04 |
| E | 0.00E+00 | 0.00E+00 | 6.87E−03 | −2.45E−03 | 2.43E−02 | 3.19E−04 |
| F | 0.00E+00 | 0.00E+00 | −1.00E−02 | −3.83E−04 | −1.62E−04 | −3.20E−05 |
| G | 0.00E+00 | 0.00E+00 | 0.00E+00 | 0.00E+00 | 0.00E+00 | 0.00E+00 |

Figure 11:
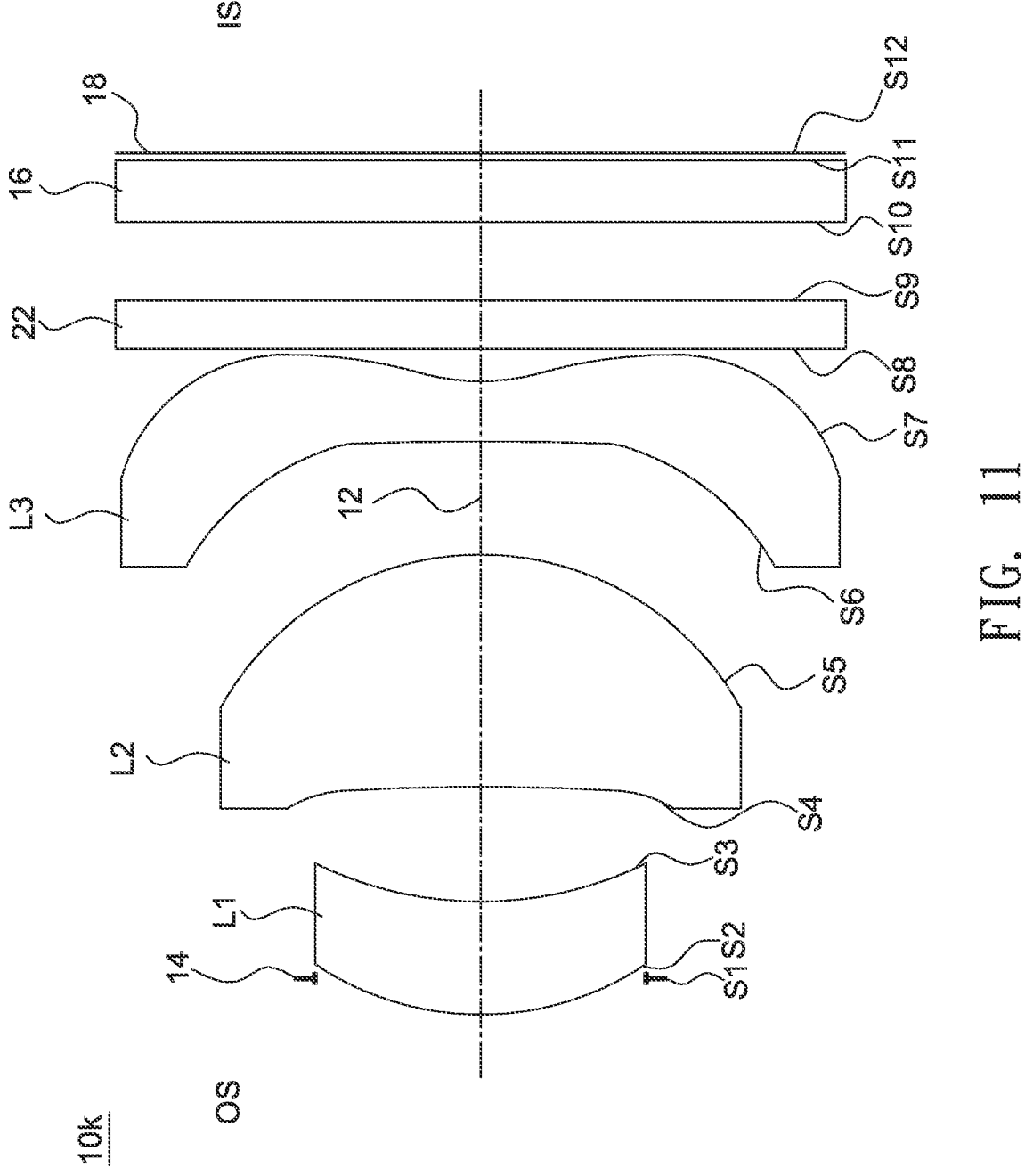
FIG. 11 shows a cross-sectional illustration of an imaging lens according to another embodiment of the invention.

FIG. 11 shows a cross-sectional illustration of an imaging lens according to an eleventh embodiment of the invention. In this embodiment, the imaging lens 10k includes an aperture stop 14, a lens L1, a lens L2 and a lens L3 arranged in order from the magnified side OS to the minified side IS, and the refractive powers of lenses L1-L3 are positive, positive and negative, respectively. In this embodiment, the lens L1 is a molded glass aspheric lens, and lenses L2 and L3 are plastic aspheric lenses. In this embodiment, an effective focal length (EFL) is 4 mm, a horizontal field of view (HFOV) is 50.4 degrees, and an F-number of the imaging lens 10k is 2.0. A distance dBFL between the two focal planes on the optical axis respectively for 587 nm wavelength light and 940 nm wavelength light is 0.12 mm. Furthermore, in this embodiment, D1/DL=0.57, D1/LT=0.77 and DL/LT=1.35, where D1 is a lens diameter of the lens L1, DL is a lens diameter of the lens L3, and LT is a distance along the optical axis 12 between a magnified-side surface of the lens L1 and a minified-side surface of the lens L3. Detailed optical data and design parameters of the lenses and other optical components of the imaging lens 10k are shown in Table 21, and the conic coefficients and aspheric coefficients for each aspheric surface are shown in Table 22.

Figure 12:
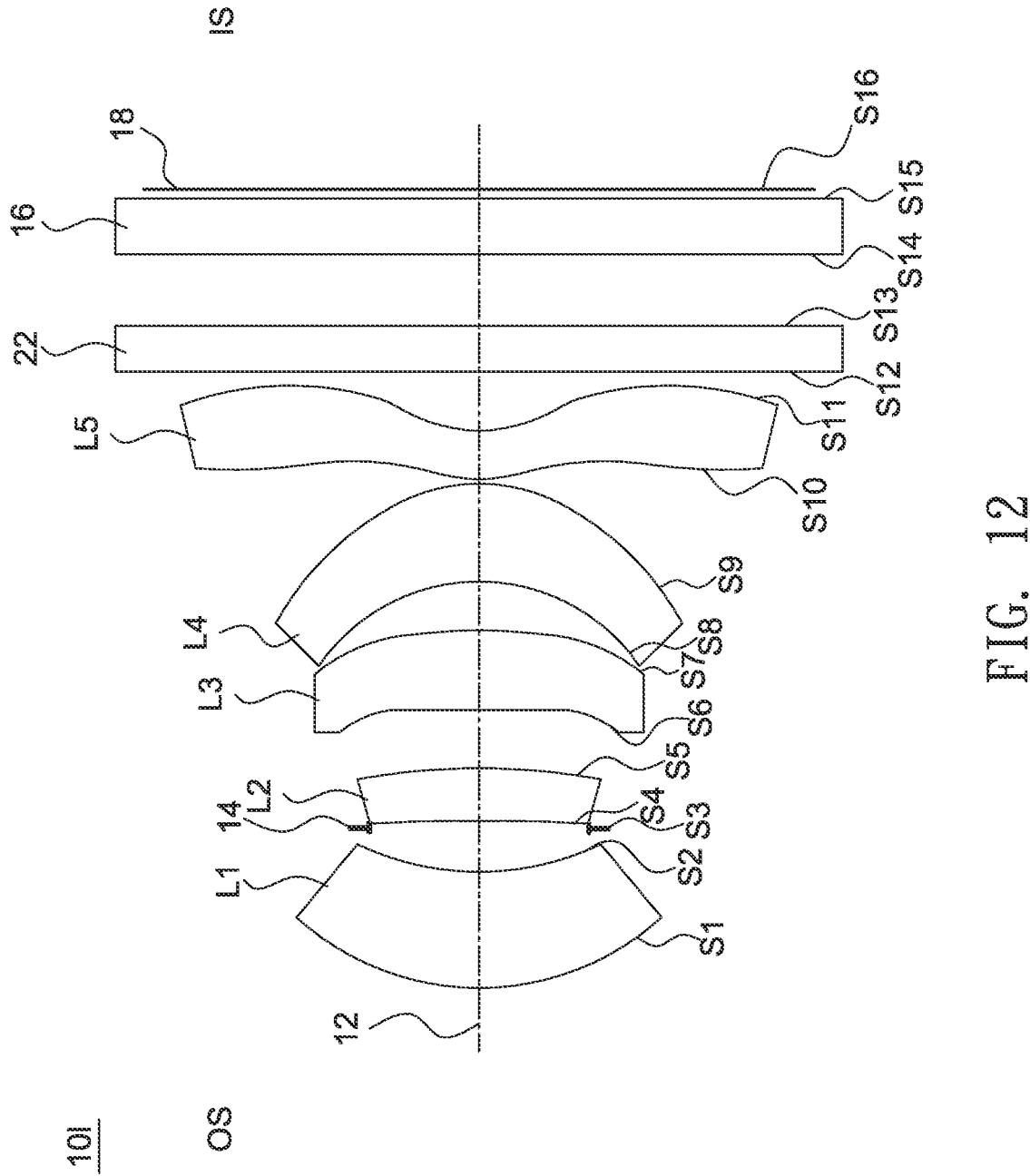
FIG. 12 shows a cross-sectional illustration of an imaging lens according to another embodiment of the invention.

FIG. 12 shows a cross-sectional illustration of an imaging lens according to a twelfth embodiment of the invention. In this embodiment, the imaging lens 10l includes a lens L1, an aperture stop 14, a lens L2, a lens L3, a lens L4 and a lens L5 arranged in order from the magnified side OS to the minified side IS, and the refractive powers of lenses L1-L5 are positive, positive, positive, positive and negative, respectively. In this embodiment, the lens L1 is a glass spherical lens, and the lenses L2, L3, L4 and L5 are plastic aspheric lenses. In this embodiment, an effective focal length (EFL) is 3.99 mm, a horizontal field of view (HFOV) is 50.3 degrees, and an F-number of the imaging lens 10l is 2.0. A distance dBFL between the two focal planes on the optical axis respectively for 587 nm wavelength light and 940 nm wavelength light is 0.11 mm. Furthermore, in this embodiment, D1/DL=0.69, D1/LT=0.91 and DL/LT=1.32, where D1 is a lens diameter of the lens L1, DL is a lens diameter of the lens L5, and LT is a distance along the optical axis 12 between a magnified-side surface of the lens L1 and a minified-side surface of the lens L5. Detailed optical data and design parameters of the lenses and other optical components of the imaging lens 10l are shown in Table 23, and the conic coefficients and aspheric coefficients for each aspheric surface are shown in Table 24.

TABLE 21

| Object description | Surface | Radius of curvature (mm) | Interval (mm) | Refractive index (nd) | Abbe number (Vd) |
|---|---|---|---|---|---|
| aperture stop 14 | S1 | INF | −0.281 |  |  |
| lens L1(aspheric) | S2* | 1.89 | 0.700 | 1.80 | 41 |
|  | S3* | 2.26 | 0.748 |  |  |
| lens L2(aspheric) | S4* | 110.03 | 1.457 | 1.64 | 24 |
|  | S5* | −2.07 | 0.745 |  |  |
| lens L3(aspheric) | S6* | 3.99 | 0.405 | 1.64 | 24 |
|  | S7* | 1.43 | 0.203 |  |  |
| filter 22 | S8 | INF | 0.300 | 1.52 | 64 |
|  | S9 | INF | 0.500 |  |  |
| cover glass 16 | S10 | INF | 0.400 | 1.52 | 64 |
|  | S11 | INF | 0.045 |  |  |
| image plane 18 | S12 | INF |  |  |  |

TABLE 23

| Object description | Surface | Radius of curvature (mm) | Interval (mm) | Refractive index (nd) | Abbe number (Vd) |
|---|---|---|---|---|---|
| lens L1(meniscus) | S1 | 1.82 | 0.805 | 1.90 | 31 |
|  | S2 | 2.00 | 0.241 |  |  |
| aperture stop 14 | S3 | INF | 0.095 |  |  |
| lens L2(aspheric) | S4* | 16.72 | 0.371 | 1.64 | 24 |
|  | S5* | −27.96 | 0.406 |  |  |
| lens L3(aspheric) | S6* | 13.86 | 0.536 | 1.54 | 56 |
|  | S7* | −4.91 | 0.321 |  |  |
| lens L4(aspheric) | S8* | −1.38 | 0.690 | 1.64 | 24 |
|  | S9* | −1.06 | 0.050 |  |  |
| lens L5(aspheric) | S10* | 1.50 | 0.332 | 1.54 | 56 |
|  | S11* | 0.82 | 0.406 |  |  |
| filter 22 | S12 | INF | 0.300 | 1.52 | 64 |
|  | S13 | INF | 0.500 |  |  |

TABLE 22

|  | S2* | S3* | S4* | S5* | S6* | S7* |
|---|---|---|---|---|---|---|
| K | 0.27 | 2.33 | 0.00 | −1.13 | −100.00 | −8.28 |
| A | 0.00E+00 | −3.60E−03 | −3.21E−02 | −3.78E−02 | −1.92E−01 | −9.99E−02 |
| B | 0.00E+00 | 9.81E−04 | −2.39E−02 | 1.64E−02 | 5.94E−02 | 3.44E−02 |
| C | 0.00E+00 | −8.33E−03 | 2.52E−02 | −1.88E−02 | −6.13E−03 | −1.01E−02 |
| D | 0.00E+00 | 0.00E+00 | −3.83E−02 | 1.09E−02 | −6.01E−04 | 1.97E−03 |
| E | 0.00E+00 | 0.00E+00 | 2.41E−02 | −3.59E−03 | −3.57E−05 | −2.52E−04 |
| F | 0.00E+00 | 0.00E+00 | −7.00E−03 | 4.49E−04 | 2.12E−05 | 1.33E−05 |
| G | 0.00E+00 | 0.00E+00 | 0.00E+00 | 0.00E+00 | 0.00E+00 | 0.00E+00 |

TABLE 23-continued

| Object description | Surface | Radius of curvature (mm) | Interval (mm) | Refractive index (nd) | Abbe number (Vd) |
|---|---|---|---|---|---|
| cover glass 16 | S14 | INF | 0.400 | 1.52 | 64 |
| | S15 | INF | 0.045 | | |
| image plane 18 | S16 | INF | | | |

TABLE 24

| | S4* | S5* | S6* | S7* | S8* | S9* | S10* | S11* |
|---|---|---|---|---|---|---|---|---|
| K | 0.00 | 0.00 | 0.00 | 0.00 | −0.40 | −0.85 | −12.43 | −4.74 |
| A | −9.29E−02 | −1.39E−01 | −1.68E−01 | −1.04E−01 | 1.21E−02 | 1.02E−01 | −1.31E−01 | −1.23E−01 |
| B | 4.83E−03 | 3.84E−03 | −4.00E−02 | −1.92E−02 | −1.18E−01 | −1.08E−01 | 6.04E−02 | 6.27E−02 |
| C | −3.35E−02 | −2.42E−02 | −6.75E−02 | 8.08E−03 | 1.59E−01 | 6.25E−02 | −2.09E−02 | −2.70E−02 |
| D | 0.00E+00 | 0.00E+00 | 0.00E+00 | 0.00E+00 | −6.96E−02 | −1.67E−02 | 5.90E−03 | 7.41E−03 |
| E | 0.00E+00 | 0.00E+00 | 0.00E+00 | 0.00E+00 | 0.00E+00 | 0.00E+00 | −9.53E−04 | −1.13E−03 |
| F | 0.00E+00 | 0.00E+00 | 0.00E+00 | 0.00E+00 | 0.00E+00 | 0.00E+00 | 6.34E−05 | 7.59E−05 |
| G | 0.00E+00 | 0.00E+00 | 0.00E+00 | 0.00E+00 | 0.00E+00 | 0.00E+00 | 0.00E+00 | 0.00E+00 |

Figure 13:
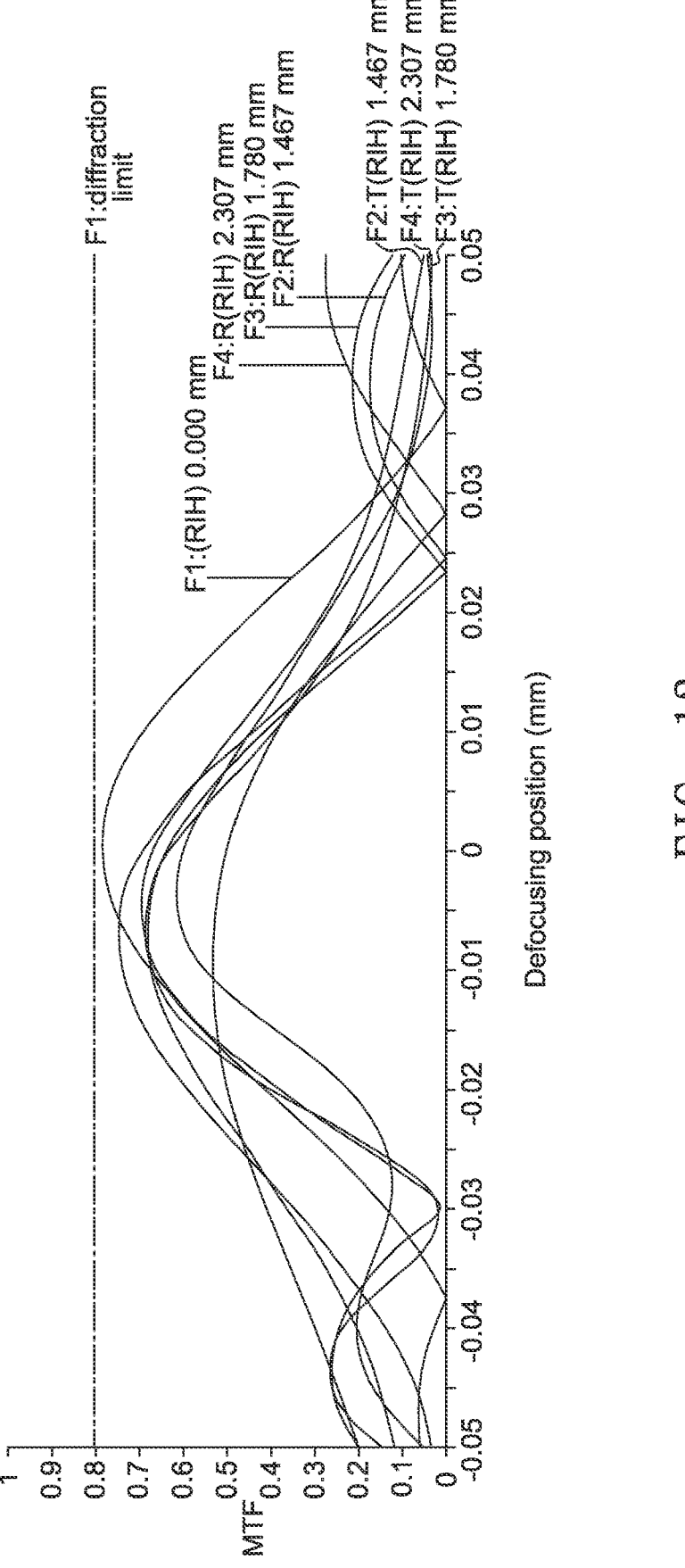
FIG. 13 shows a modulation transfer function curve of the imaging lens 10$a$ illustrated in FIG. 1.
Figure 14:
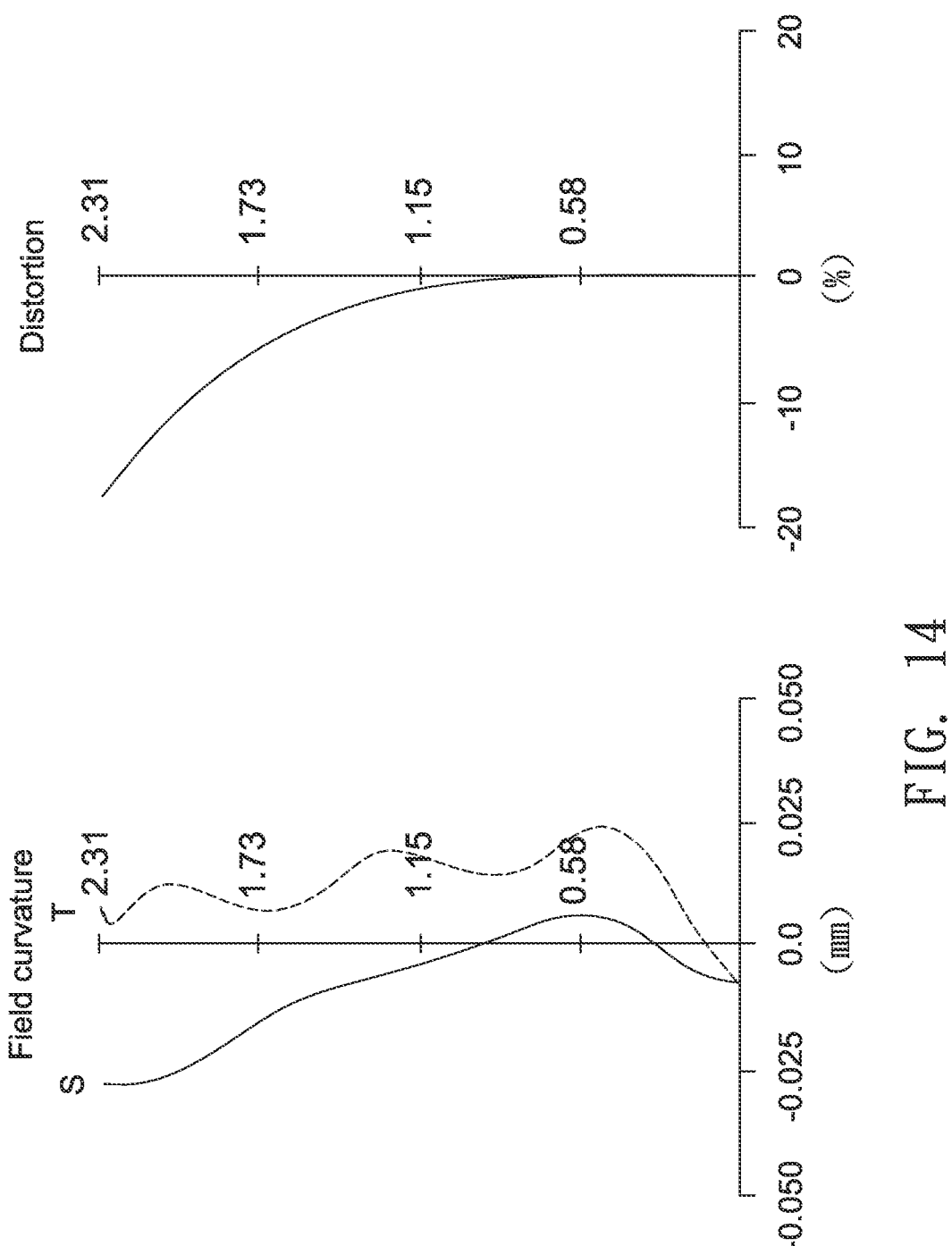
FIG. 14 shows field curvature and distortion curves of the imaging lens 10$a$ illustrated in FIG. 1.
Figure 15:
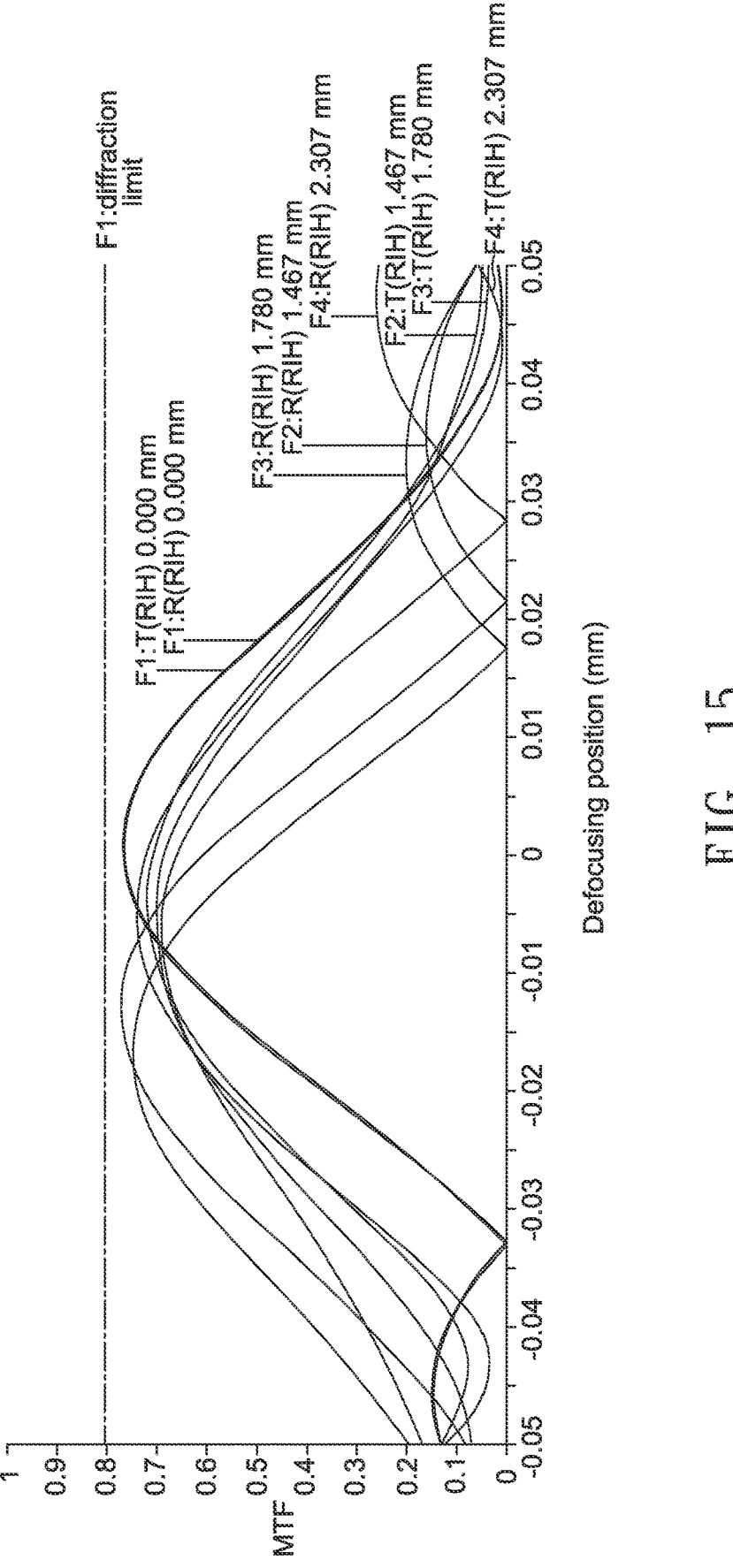
FIG. 15 shows a modulation transfer function curve of the imaging lens 10$f$ illustrated in FIG. 6.
Figure 16:
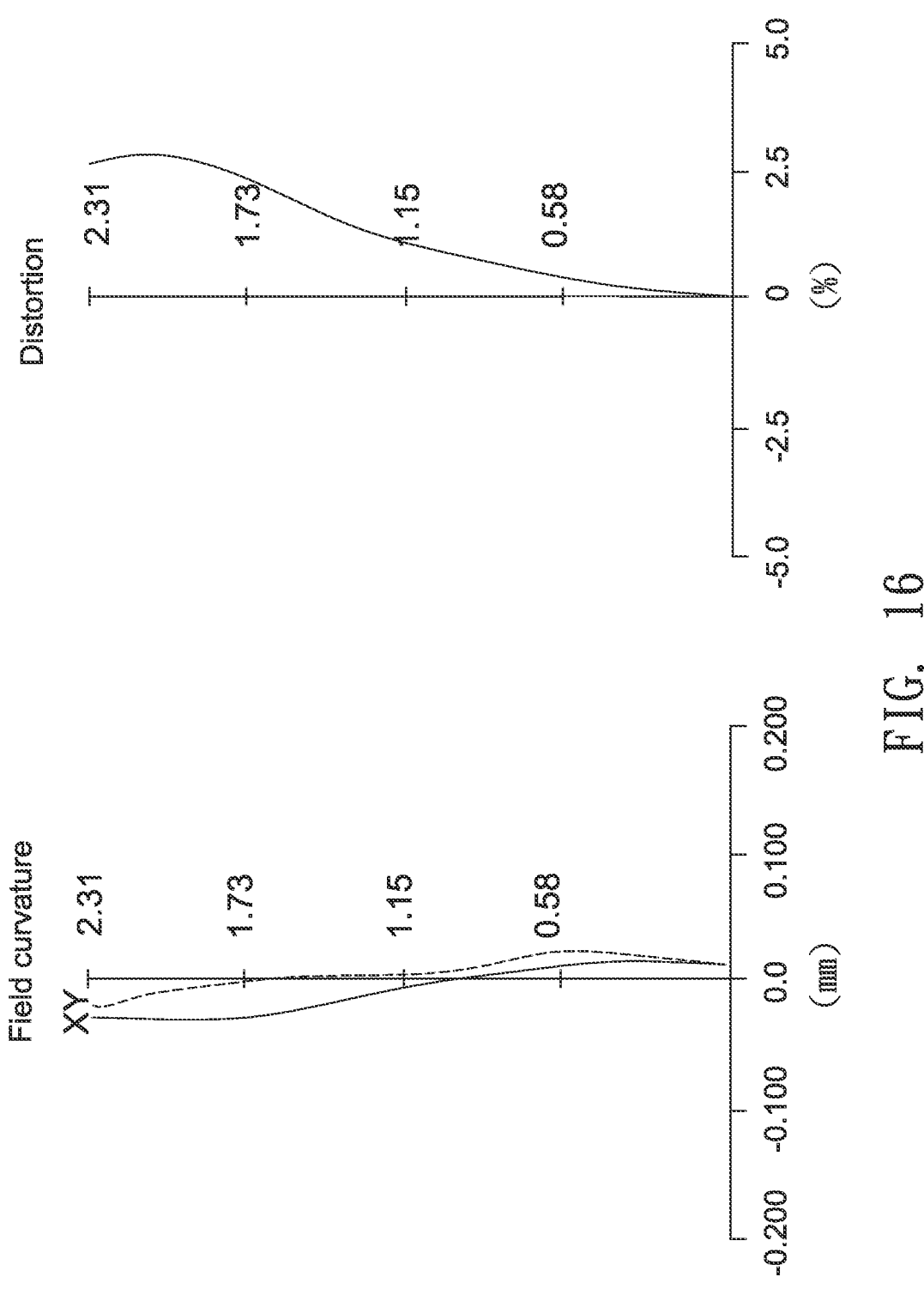
FIG. 16 shows field curvature and distortion curves of the imaging lens 10$f$ illustrated in FIG. 6.
Figure 17:
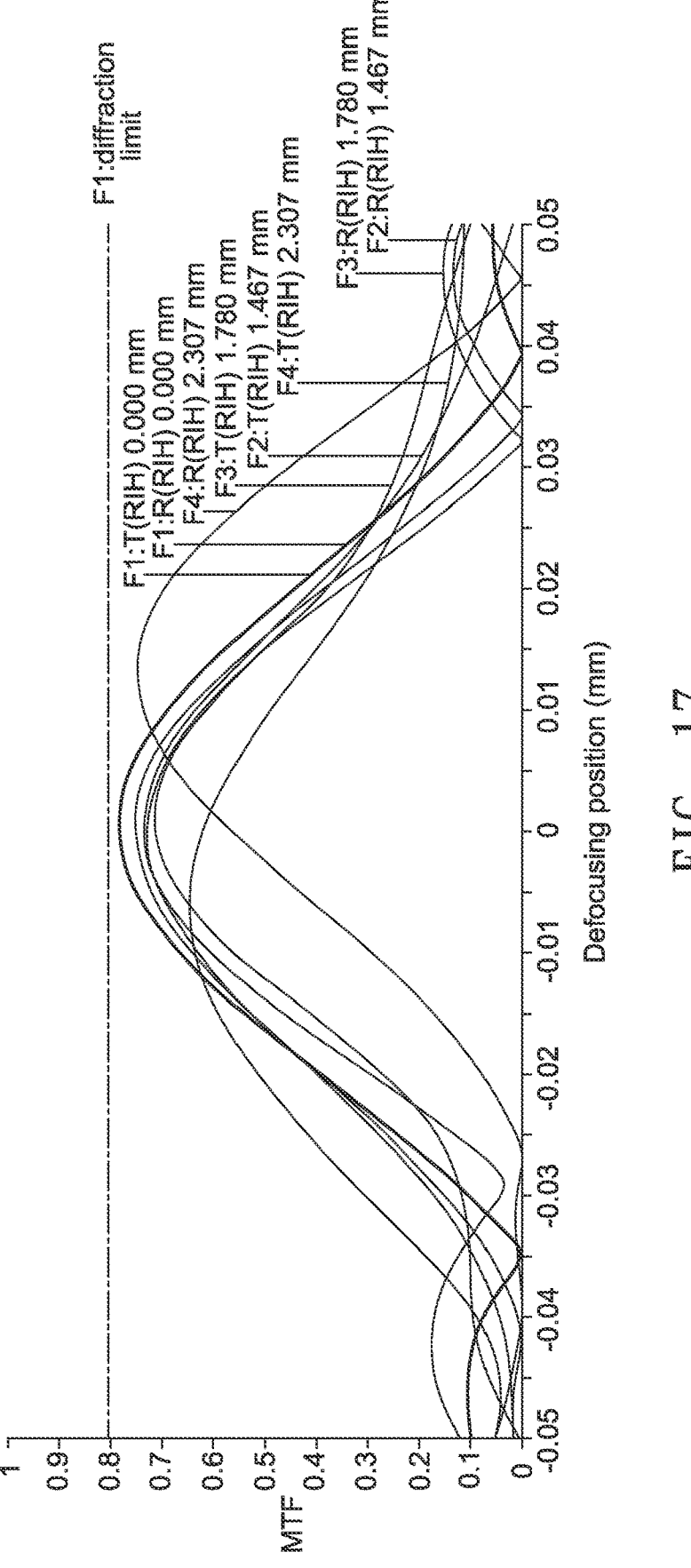
FIG. 17 shows a modulation transfer function curve of the imaging lens 10$l$ illustrated in FIG. 12.
Figure 18:
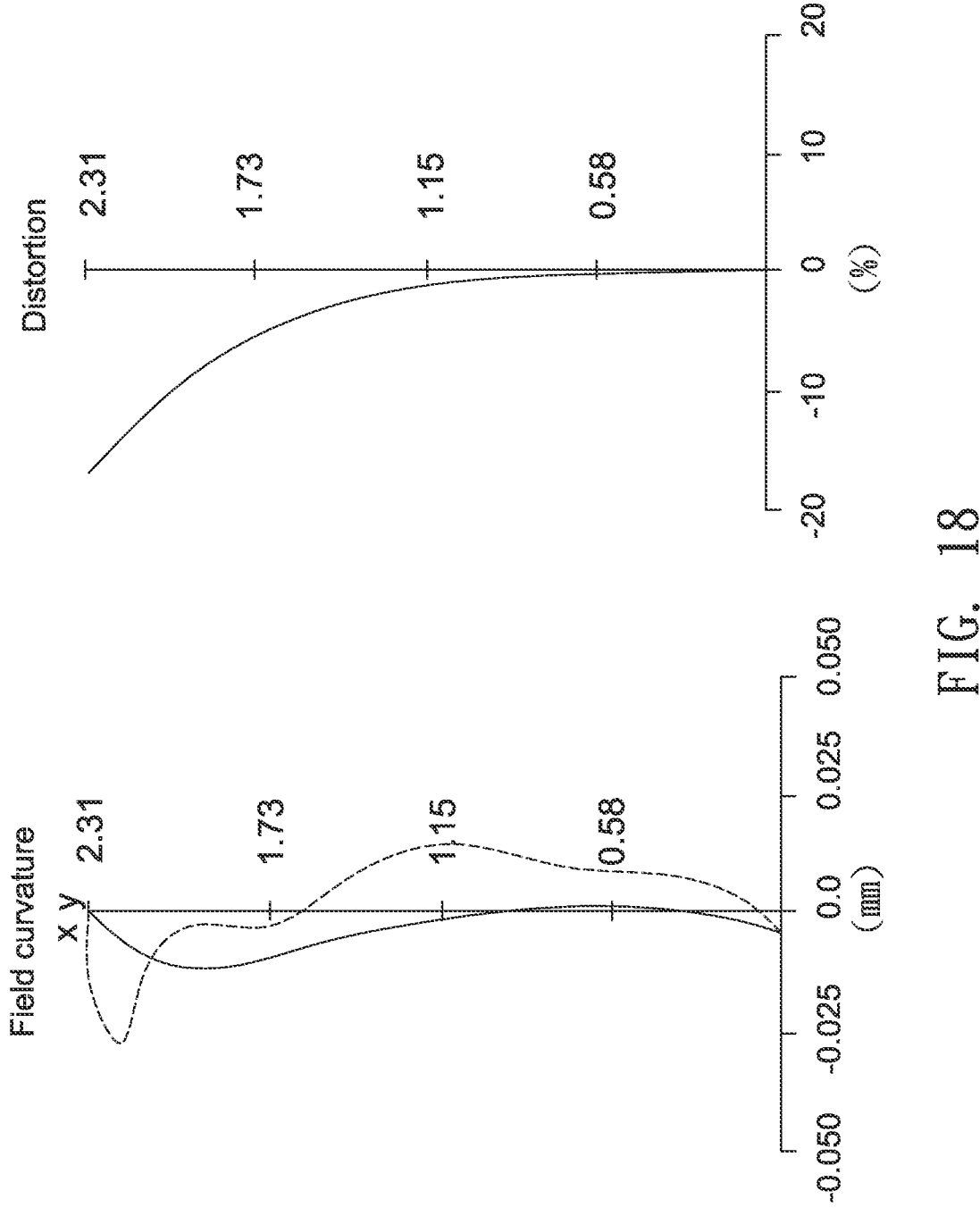
FIG. 18 shows field curvature and distortion curves of the imaging lens 10$l$ illustrated in FIG. 12.

FIG. 13 shows a modulation transfer function (MTF) curve of the imaging lens 10a illustrated in FIG. 1, and FIG. 14 shows field curvature and distortion curves of the imaging lens 10a illustrated in FIG. 1. FIG. 15 shows a modulation transfer function (MTF) curve of the imaging lens 10f illustrated in FIG. 6, and FIG. 16 shows field curvature and distortion curves of the imaging lens 10f illustrated in FIG. 6. FIG. 17 shows a modulation transfer function (MTF) curve of the imaging lens 10l illustrated in FIG. 12, FIG. 18 shows field curvature and distortion curves of the imaging lens 10l illustrated in FIG. 12. Because the graphs shown in FIGS. 13-18 are all within the standard range, it can be verified that the imaging lenses of the embodiments can achieve high-resolution infrared imaging effects.

According to the above embodiments, by arranging the lens closest to the object side as a glass lens, the imaging lens is allowed to operate at a wide working temperature range (from −40 degrees to 105 degrees) to ensure stable image qualities under harsh environments with large temperature differences. Moreover, using several plastic aspheric lenses in the design can provide lower manufacturing costs while maintaining good image quality. Additionally, the imaging lens may essentially consist of three to five singlet lenses without any cemented lens, which may further reduce manufacturing costs and overall weight. Through the designs of various embodiments of the invention, an infrared imaging lens with at least one of the advantages of lightweight, low manufacturing costs, low thermal drift, wide working temperature ranges, and high-resolution image quality can be provided.

Though the embodiments of the invention have been presented for purposes of illustration and description, they are not intended to be exhaustive or to limit the invention. Accordingly, many modifications and variations without departing from the spirit of the invention or essential characteristics thereof will be apparent to practitioners skilled in this art. It is intended that the scope of the invention be defined by the claims appended hereto and their equivalents in which all terms are meant in their broadest reasonable sense unless otherwise indicated.

What is claimed is:

1. An imaging lens, comprising:
a first lens having positive refractive power, a second lens and a third lens arranged in order from an object side to an image side of the imaging lens; and
an aperture stop disposed between the object side and the second lens, wherein the second lens and the third lens are aspheric lenses, a total number of lenses with refractive powers of the imaging lens is at most five, the three lenses closest to the image side of the imaging lens have respective refractive powers of positive, positive, and negative in order from the object side to the image side, a horizontal field of view of the imaging lens ranges from 40 to 67 degrees, an interval between every two adjacent lenses in the imaging lens is fixed, and the imaging lens satisfies the following conditions:
(1) 0.07 mm<dBFL<0.17 mm; and
(2) 1<DL/LT<1.79, where dBFL denotes a distance between a focal plane formed by light with a wavelength of 587 nm and a focal plane formed by light with a wavelength of 940 nm on an optical axis of the imaging lens when a subject to be captured is at infinity, DL is a lens diameter of the third lens, LT is a distance measured on the optical axis of the imaging lens between an object-side surface of the first lens and an image-side surface of the third lens.

2. The imaging lens as claimed in claim 1, wherein a center part of the object-side surface of the first lens is convex, and a center part of the image-side surface of the third lens is concave.

3. The imaging lens as claimed in claim 1, wherein the imaging lens satisfies a condition of 0.58<D1/LT<1.17, where D1 is a lens diameter of the first lens.

4. The imaging lens as claimed in claim 1, wherein the first lens has a refractive index greater than 1.7 and an Abbe number less than 50.

5. The imaging lens as claimed in claim 1, wherein a total number of lenses with refractive powers of the imaging lens is three, four or five.

6. The imaging lens as claimed in claim 1, wherein an F-number of the imaging lens ranges from 1.6 to 2.4.

7. The imaging lens as claimed in claim 1, wherein the first lens is made of glass, and at least one of the second lens and the third lens is made of plastic.

8. The imaging lens as claimed in claim 1, wherein a thermal drift of the imaging lens is less than 15 μm, where the thermal drift is an offset of a focal plane at 105° C. relative to a focal plane at 25° C. of the imaging lens.

9. An imaging lens, comprising:
a first lens, wherein the first lens is a lens with a positive refractive power closest to a magnified side of the imaging lens;
a second lens with a refractive power;
a third lens, wherein the third lens is a lens with a refractive power closest to a minified side of the imaging lens; and
an aperture stop disposed between the magnified side and the second lens, wherein the imaging lens includes at least two aspheric lenses, a total number of lenses with refractive powers of the imaging lens is at most five, the three lenses closest to the minified side of the imaging lens have respective refractive powers of positive, positive, and negative in order from the object side to the minified side, a horizontal field of view of the imaging lens ranges from 40 to 67 degrees, and the imaging lens satisfies the following conditions:

(1) 0.07 mm<dBFL<0.17 mm; and (2) 0.48<D1/DL<0.77, where dBFL denotes a distance between a focal plane formed by light with a wavelength of 587 nm and a focal plane formed by light with a wavelength of 940 nm on an optical axis of the imaging lens when a subject to be captured is at infinity, D1 is a lens diameter of the first lens, and DL is a lens diameter of the third lens.

10. The imaging lens as claimed in claim 9, wherein a center part of the magnified-side surface of the first lens is convex, and a center part of the minified-side surface of the third lens is concave.

11. The imaging lens as claimed in claim 9, wherein the imaging lens satisfies a condition of 0.58<D1/LT<1.17, where D1 is a lens diameter of the first lens, and LT is a distance measured on the optical axis of the imaging lens between a magnified-side surface of the first lens and a minified-side surface of the third lens.

12. The imaging lens as claimed in claim 9, wherein the first lens has a refractive index greater than 1.7 and an Abbe number less than 50.

13. The imaging lens as claimed in claim 9, wherein a total number of lenses with refractive powers of the imaging lens is three, four or five.

14. The imaging lens as claimed in claim 9, wherein an F-number of the imaging lens ranges from 1.6 to 2.4.

15. The imaging lens as claimed in claim 9, wherein the first lens is made of glass, and at least one of the second lens and the third lens is made of plastic.

16. The imaging lens as claimed in claim 9, wherein a thermal drift of the imaging lens is less than 15 μm, where the thermal drift is an offset of a focal plane at 105° C. relative to a focal plane at 25° C. of the imaging lens.

* * * * *